United States Patent
Hao et al.

(10) Patent No.: US 12,494,811 B2
(45) Date of Patent: Dec. 9, 2025

(54) BLUETOOTH COMMUNICATION METHOD, WEARABLE DEVICE, AND SYSTEM

(71) Applicant: Huawei Technologies Co., Ltd., Shenzhen (CN)

(72) Inventors: Liang Hao, Xi'an (CN); Shufeng Wang, Xi'an (CN); Feng Zhang, Xi'an (CN); Fabo Wang, Xi'an (CN); Wanqing Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 18/041,354

(22) PCT Filed: Jul. 26, 2021

(86) PCT No.: PCT/CN2021/108488
§ 371 (c)(1),
(2) Date: Feb. 10, 2023

(87) PCT Pub. No.: WO2022/033296
PCT Pub. Date: Feb. 17, 2022

(65) Prior Publication Data
US 2023/0299806 A1    Sep. 21, 2023

(30) Foreign Application Priority Data
Aug. 12, 2020   (CN) ......................... 202010808831.7

(51) Int. Cl.
*H04B 1/3827*    (2015.01)
*H04W 76/19*    (2018.01)
*H04W 76/30*    (2018.01)

(52) U.S. Cl.
CPC ............ *H04B 1/385* (2013.01); *H04W 76/19* (2018.02); *H04W 76/30* (2018.02)

(58) Field of Classification Search
CPC ....... H04W 76/19; H04W 76/30; H04B 1/385
See application file for complete search history.

(56) References Cited

U.S. PATENT DOCUMENTS 12,250,335 B2 *   3/2025   Peng ................. H04W 52/0245

FOREIGN PATENT DOCUMENTS

| CN | 106658678 | * | 5/2017 | ............. H04W 4/00 |
| CN | 106658678 A | | 5/2017 | |
| CN | 110191442 A | | 8/2019 | |

(Continued)

*Primary Examiner* — Tuan H Nguyen
(74) *Attorney, Agent, or Firm* — Conley Rose, P.C.

(57) ABSTRACT

This application relates to the field of terminal technologies, and provides a Bluetooth communication method, a wearable device, and a system, to avoid always maintaining an HFP connection, so as to avoid an unnecessary delay or a call error caused when an electronic device processes a voice message. The Bluetooth communications system includes an electronic device and a wearable device, and an HFP connection is established between the electronic device and the wearable device. When the electronic device meets a preset condition, the HFP connection is automatically disconnected. The electronic device sends a first notification to the wearable device after receiving an incoming call, to reestablish the HFP connection. In this case, the electronic device may answer the incoming call by using the wearable device.

20 Claims, 35 Drawing Sheets

(56) References Cited

FOREIGN PATENT DOCUMENTS

| | | |
|---|---|---|
| CN | 110248347 A | 9/2019 |
| EP | 3537734 A1 | 9/2019 |
| KR | 20160066344 A | 6/2016 |

\* cited by examiner

BLUETOOTH COMMUNICATION METHOD, WEARABLE DEVICE, AND SYSTEM

CROSS-REFERENCE TO RELATED APPLICATIONS

This is a U.S. National Stage of International Patent Application No. PCT/CN2021/108488 filed on Jul. 26, 2021, which claims priority to Chinese Patent application Ser. No. 202010808831.7 filed on Aug. 12, 2020. Both of the aforementioned applications are hereby incorporated by reference in their entireties.

TECHNICAL FIELD

This application relates to the field of terminal technologies, and in particular, to a Bluetooth communication method, a wearable device, and a system.

BACKGROUND

With development of wireless technologies, a Bluetooth technology is widely applied to wearable devices such as a headset and a watch, to implement Bluetooth calling by using the wearable device, and improve calling convenience. To implement a Bluetooth call function, a hands-free protocol (hands-free protocol, HFP) connection between the wearable device and an electronic device needs to be established in advance. Subsequently, when receiving a call service, the electronic device establishes, based on the HFP connection, an extended synchronous connection oriented (extended synchronous connection oriented links, eSco) link between the electronic device and the wearable device as an audio data transmission channel, to process the call service by using the wearable device. After the call service ends, the electronic device disconnects the eSco between the electronic device and the wearable device, but maintains the HFP connection to process a next call service.

When the electronic device establishes the HFP connection to the wearable device, if the electronic device needs to process a call service, the electronic device invokes, by default, the wearable device that establishes the HFP connection to the electronic device, to process audio data of the call service, for example, receive the audio data or play the audio data. However, in some scenarios, if the call service is a service such as a short message voice chat or a video call in an instant messaging application, processing by using the wearable device (such as a smart watch or a smart band) is inconvenient for a user operation. This is because a user needs to manually operate the electronic device, for example, select a contact, tap an unread "voice", or view an image of the other party, and the user needs to listen to a voice by using the wearable device. User experience is poor when the user operates two devices at the same time.

Based on the foregoing scenario, a solution is provided in the conventional technology. If the electronic device needs to process the call service, the electronic device sends an eSco establishment request to the wearable device, and the wearable device first establishes an eSco with the electronic device. Then, if the wearable device determines that the current call service is a call service in an instant messaging application, the wearable device disconnects the eSco. In this way, the electronic device can process the call service by using an audio module of the electronic device, that is, it is ensured that the user can complete the call service by operating one device. However, in this solution, a specific delay is caused in a process from establishing the eSco to disconnecting the eSco. For example, if the user needs to record a short voice message, after the user taps to start recording, before recording is started, the user needs to wait until the electronic device can use a microphone to perform sound pickup. Consequently, user experience is poor.

SUMMARY

This application provides a Bluetooth communication method, a wearable device, and a system, so that an HFP connection can be automatically disconnected when an electronic device meets a preset condition. In this way, after detecting an operation of playing a voice message, the electronic device does not play the voice message by using a wearable device, and an unnecessary delay is not caused. In addition, after receiving an incoming call, the electronic device can reestablish the HFP connection, to ensure that the electronic device can answer the incoming call by using the wearable device.

To achieve the foregoing objective, this application uses the following technical solutions.

According to a first aspect, this application provides a Bluetooth communications system. The Bluetooth communications system includes an electronic device and a wearable device, and a hands-free protocol HFP connection is established between the electronic device and the wearable device. The electronic device is configured to automatically disconnect the HFP connection when the electronic device meets a preset condition. The electronic device is further configured to send a first notification to the wearable device after receiving an incoming call. The wearable device is configured to establish the HFP connection to the electronic device based on the first notification. The electronic device is further configured to: after detecting an operation of answering the incoming call by a user, send first audio data of the incoming call to the wearable device and/or receive second audio data of the incoming call sent by the wearable device.

Optionally, the preset condition includes that the electronic device does not receive an incoming call or does not detect an operation of making an outgoing call. When the electronic device and the wearable device maintain the HFP connection, the electronic device sends a corresponding call status to the wearable device when receiving an incoming call or detecting an operation of making an outgoing call. In this case, the wearable device may determine, based on the HFP connection, whether the current electronic device needs to process a call, and if the current electronic device does not need to process a call, the wearable device may disconnect the HFP connection.

In this way, the HFP connection is automatically disconnected by determining whether the electronic device meets the preset condition. This can effectively avoid a delay caused when the HFP connection is maintained, and an eSco link is established and disconnected between the electronic device and the wearable device when the electronic device receives a service such as a voice message, a video call, or an audio call.

In addition, when receiving the incoming call, the electronic device can notify the wearable device, to reestablish the HFP connection. In addition to ensuring that no unnecessary delay is caused, it can be further ensured that the electronic device can answer a call by using the wearable device, so that user experience is improved.

Optionally, an application, for example, an application A, used to manage the wearable device, may be installed in the electronic device. The application A may be a third-party application. The application A may monitor whether the electronic device receives the incoming call, and send the first notification to the wearable device when the incoming call is received, to reestablish the HFP connection.

In a possible implementation, the electronic device is further configured to send a second notification to the wearable device after detecting an operation of making an outgoing call by the user. The wearable device is further configured to establish the HFP connection to the electronic device based on the second notification. After a call connection is established, the electronic device is further configured to send third audio data of the outgoing call to the wearable device and/or receive fourth audio data of the outgoing call sent by the wearable device.

In other words, when the electronic device needs to process a first call service of an incoming call or an outgoing call, the electronic device may send a notification to the wearable device, to reestablish the HFP connection, to ensure that the wearable device can be used to play audio of a call and collect user audio in a call process.

In a possible implementation, the wearable device is further configured to disconnect the HFP connection to the electronic device after detecting a call termination operation or receiving a call termination indication sent by the electronic device.

The user may hang up a call through an operation on the wearable device after the call is terminated. Generally, after the call is hung up, the electronic device currently does not need to process the first call service of the incoming call or the outgoing call. In this case, the wearable device disconnects the HFP connection when determining that the electronic device currently meets the preset condition. Therefore, an unnecessary delay caused when the electronic device subsequently receives a second call service such as a voice message is avoided. Alternatively, the user may hang up the call through an operation on the electronic device after the call is terminated. In this case, after detecting a hang-up operation, the electronic device sends an indication to the wearable device, or the wearable device disconnects the HFP connection when detecting that the call is disconnected.

In a possible implementation, the electronic device is further configured to: when detecting an operation of playing first audio of a first application or recording second audio by using the first application, play the first audio or record the second audio.

The first application may be a third-party instant messaging application (for example, "WeChat", "QQ", or a video conference application), and services such as a voice message chat, an audio call, a video call, and a telephone voice in the first application may be described as the second call service. In other words, generally, call services may include the first call service and the second call service. The first call service includes services such as answering a call and making a call in a call application. The second call service includes a call service in the first application.

Generally, the first application is installed in the electronic device. Correspondingly, a watch version of the first application is installed in the wearable device, for example, a smart watch. Certainly, the first application may alternatively not be installed in the wearable device.

In this case, when detecting an operation of playing audio of the first application or recording audio, the electronic device does not detect a disconnected HFP connection, and can directly process the audio by using an audio module of the electronic device, such as a speaker or a microphone. For example, based on a corresponding operation, a voice message is directly played or a message is directly started to be recorded. This avoids a delay caused when the electronic device invokes the wearable device to process a corresponding service after detecting the HFP connection.

In a possible implementation, the operation of playing the first audio includes any one of the following: an operation of playing a first voice message, an operation of answering a video call, and an operation of answering an audio call.

In a possible implementation, the operation of recording the second audio by using the first application includes an operation of recording a second voice message by using the first application or an operation of performing voice recording by using the first application.

In a possible implementation, the electronic device is further configured to collect third audio after a video call connection or an audio call connection is established.

In a video call scenario and an audio call scenario, the electronic device may collect audio by using an audio module of the electronic device. The wearable device does not need to be invoked as an audio collection module.

According to a second aspect, this application provides a Bluetooth communication method, applied to a system including an electronic device and a wearable device, and a hands-free protocol HFP connection is established between the electronic device and the wearable device. The method includes: When the electronic device meets a preset condition, the electronic device automatically disconnects the HFP connection. The electronic device sends a first notification to the wearable device after receiving an incoming call, so that the wearable device establishes the HFP connection to the electronic device based on the first notification. After detecting an operation of answering the incoming call by a user, the electronic device sends first audio data of the incoming call to the wearable device and/or receives second audio data of the incoming call sent by the wearable device.

In a possible implementation, before the HFP connection is established between the electronic device and the wearable device, the method further includes: The electronic device sends a second notification to the wearable device after detecting an operation of making an outgoing call by the user, so that the wearable device establishes the HFP connection to the electronic device based on the second notification. After a call connection is established, the electronic device sends third audio data of the outgoing call to the wearable device and/or receives fourth audio data of the outgoing call sent by the wearable device.

In a possible implementation, the method further includes: after a call is terminated, the electronic device disconnects the HFP connection to the wearable device.

In a possible implementation, the method further includes: When detecting an operation of playing first audio of a first application or recording second audio by using the first application, the electronic device plays the first audio or records the second audio.

In a possible implementation, the operation of playing the first audio includes any one of the following: an operation of playing a first voice message, an operation of answering a video call, and an operation of answering an audio call.

In a possible implementation, the operation of recording the second audio by using the first application includes an operation of recording a second voice message by using the first application or an operation of performing voice recording by using the first application.

In a possible implementation, the method further includes: The electronic device collects third audio after a video call connection or an audio call connection is established.

In a possible implementation, the preset condition includes that the electronic device does not receive an incoming call or does not detect an operation of making an outgoing call.

In addition, for technical effects of the Bluetooth communication method in the second aspect, refer to the technical effects of the Bluetooth communications system in the first aspect. Details are not described herein again.

According to a third aspect, this application provides a Bluetooth communication method, applied to a system including an electronic device and a wearable device, and a hands-free protocol HFP connection is established between the electronic device and the wearable device. The method includes: When determining that the electronic device meets a preset condition, the wearable device automatically disconnects the HFP connection. The wearable device receives a first notification, and establishes the HFP connection to the electronic device based on the first notification, where the first notification is a notification sent to the wearable device after the electronic device receives an incoming call. The wearable device receives first audio data of the incoming call sent by the electronic device and/or sends second audio data of the incoming call to the electronic device.

In a possible implementation, the method further includes: The wearable device receives a second notification, and establishes the HFP connection to the electronic device based on the second notification, where the second notification is a notification sent to the wearable device after the electronic device detects an operation of making an outgoing call by a user. After a call connection is established, the wearable device receives third audio data of the outgoing call sent by the electronic device and/or sends fourth audio data of the outgoing call to the electronic device.

In a possible implementation, the method further includes: The wearable device disconnects the HFP connection to the electronic device after detecting a call termination operation or receiving a call termination indication sent by the electronic device.

In a possible implementation, the preset condition includes that the electronic device does not receive an incoming call or does not detect an operation of making an outgoing call.

In addition, for technical effects of the Bluetooth communication method in the third aspect, refer to the technical effects of the Bluetooth communications system in the first aspect. Details are not described herein again.

According to a fourth aspect, this application provides an electronic device, including a processor, a memory, and an audio module, where the memory and the audio module are coupled to the processor, the memory is configured to store computer program code, the computer program code includes computer instructions, and when the processor reads the computer instructions from the memory, the electronic device is enabled to perform the following operations: automatically disconnecting a hands-free protocol HFP connection to a wearable device when a preset condition is met; sending a first notification to the wearable device after receiving an incoming call, so that the wearable device establishes the HFP connection based on the first notification; and after detecting an operation of answering the incoming call by a user, sending first audio data of the incoming call to the wearable device and/or receiving second audio data of the incoming call sent by the wearable device.

In a possible implementation, when the processor reads the computer instructions from the memory, the electronic device is further enabled to perform the following operations: sending a second notification to the wearable device after detecting an operation of making an outgoing call by the user, so that the wearable device establishes the HFP connection based on the second notification; and after a call connection is established, sending third audio data of the outgoing call to the wearable device and/or receiving fourth audio data of the outgoing call sent by the wearable device.

In a possible implementation, when the processor reads the computer instructions from the memory, the electronic device is further enabled to perform the following operation: after a call is terminated, disconnecting the HFP connection to the wearable device.

In a possible implementation, when the processor reads the computer instructions from the memory, the electronic device is further enabled to perform the following operation: when detecting an operation of playing first audio of a first application or recording second audio by using the first application, playing the first audio or recording the second audio.

In a possible implementation, the operation of playing the first audio includes any one of the following: an operation of playing a first voice message, an operation of answering a video call, and an operation of answering an audio call.

In a possible implementation, the operation of recording the second audio by using the first application includes an operation of recording a second voice message by using the first application or an operation of performing voice recording by using the first application.

In a possible implementation, when the processor reads the computer instructions from the memory, the electronic device is further enabled to perform the following operation: collecting third audio after a video call connection or an audio call connection is established.

In a possible implementation, the preset condition includes that the electronic device does not receive an incoming call or does not detect an operation of making an outgoing call.

In addition, for technical effects of the electronic device in the fourth aspect, refer to the technical effects of the Bluetooth communications system in the first aspect. Details are not described herein again.

According to a fifth aspect, this application provides a wearable device, including a processor, a memory, and an audio module, where the memory and the audio module are coupled to the processor, the memory is configured to store computer program code, the computer program code includes computer instructions, and when the processor reads the computer instructions from the memory, the wearable device is enabled to perform the following operations: automatically disconnecting a hands-free protocol HFP connection to the electronic device when determining that the electronic device meets a preset condition: receiving a first notification, and establishing the HFP connection to the electronic device based on the first notification, where the first notification is a notification sent after the electronic device receives an incoming call; and receiving first audio data of the incoming call sent by the electronic device and/or sending second audio data of the incoming call to the electronic device.

In a possible implementation, when the processor reads the computer instructions from the memory, the wearable device is further enabled to perform the following operations: receiving a second notification, and establishing the HFP connection to the electronic device based on the second notification, where the second notification is a notification sent after the electronic device detects an operation of making an outgoing call by a user; and after a call connection is established, receiving third audio data of the outgoing call sent by the electronic device and/or sending fourth audio data of the outgoing call to the electronic device.

In a possible implementation, when the processor reads the computer instructions from the memory, the wearable device is further enabled to perform the following operation: disconnecting the HFP connection to the electronic device after detecting a call termination operation or receiving a call termination indication sent by the electronic device.

In a possible implementation, the preset condition includes that the electronic device does not receive an incoming call or does not detect an operation of making an outgoing call.

In addition, for technical effects of the wearable device in the fifth aspect, refer to the technical effects of the Bluetooth communications system in the first aspect. Details are not described herein again.

According to a sixth aspect, this application provides an electronic device. The electronic device has a function of implementing the Bluetooth communication method according to any one of the second aspect and the possible implementations of the second aspect. The function may be implemented by hardware, or may be implemented by hardware executing corresponding software. The hardware or the software includes one or more modules corresponding to the function.

According to a seventh aspect, this application provides a wearable device. The wearable device has a function of implementing the Bluetooth communication method according to any one of the third aspect and the possible implementations of the third aspect. The function may be implemented by hardware, or may be implemented by hardware executing corresponding software. The hardware or the software includes one or more modules corresponding to the function.

According to an eighth aspect, this application provides a computer-readable storage medium, including computer instructions. When the computer instructions are run on an electronic device, the electronic device is enabled to perform the Bluetooth communication method according to any one of the second aspect and the possible implementations of the second aspect.

According to a ninth aspect, this application provides a computer-readable storage medium, including computer instructions. When the computer instructions are run on a wearable device, the wearable device is enabled to perform the Bluetooth communication method according to any one of the third aspect and the possible implementations of the third aspect.

According to a tenth aspect, this application provides a computer program product. When the computer program product runs on an electronic device, the electronic device is enabled to perform the Bluetooth communication method according to any one of the second aspect and the possible implementations of the second aspect.

According to an eleventh aspect, this application provides a computer program product. When the computer program product runs on an electronic device, a wearable device is enabled to perform the Bluetooth communication method according to any one of the third aspect and the possible implementations of the third aspect.

According to a twelfth aspect, a circuit system is provided. The circuit system includes a processing circuit, and the processing circuit is configured to perform the Bluetooth communication method according to any one of the second aspect and the possible implementations of the second aspect. Alternatively, the processing circuit is configured to perform the Bluetooth communication method according to any one of the third aspect and the possible implementations of the third aspect.

According to a thirteenth aspect, an embodiment of this application provides a chip system, including at least one processor and at least one interface circuit. The at least one interface circuit is configured to perform receiving and sending functions, and send instructions to the at least one processor. When the at least one processor executes the instructions, the at least one processor performs the Bluetooth communication method according to any one of the second aspect and the possible implementations of the second aspect; or the at least one processor performs the Bluetooth communication method according to any one of the third aspect and the possible implementations of the third aspect.

DESCRIPTION OF EMBODIMENTS

With reference to the accompanying drawings, the following describes in detail a Bluetooth communication method, a wearable device, and a system provided in embodiments of this application.

The terms "including", "having", and any other variants thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

It should be noted that, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example". "for example", or the like is intended to present a related concept in a specific manner.

In the descriptions of this application, unless otherwise specified, "a plurality of" means two or more than two. The term "and/or" in this specification describes only an association relationship between associated objects and indicates that there may be three relationships. For example, A and/or B may represent the following three cases: Only A exists, both A and B exist, and only B exists.

Figure 1:
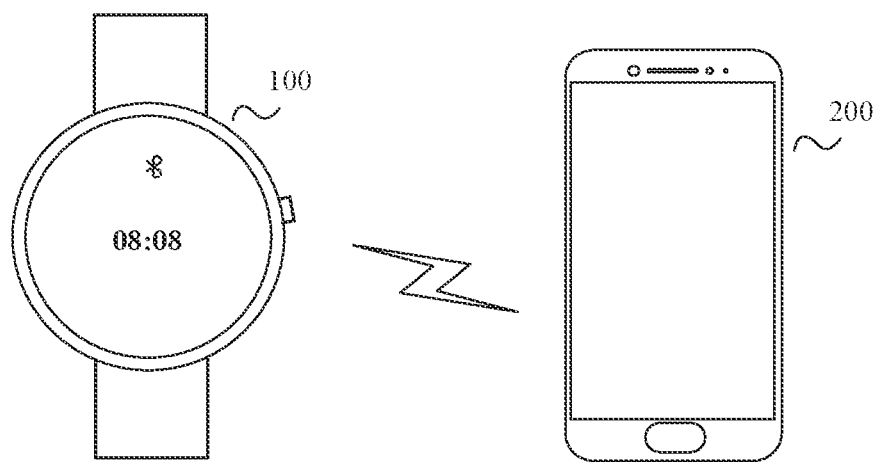
FIG. 1 is a schematic diagram of a system according to an embodiment of this application.

FIG. 1 is a schematic diagram of an application scenario of a Bluetooth communication method according to an embodiment of this application. A system to which the Bluetooth communication method is applied includes a wearable device 100 and an electronic device 200.

For example, the wearable device 100 may be a smart watch, a smart band, a wireless headset, smart glasses, a smart helmet, or the like. The electronic device 200 may be a device such as a mobile phone, a tablet computer, a notebook computer, an ultra-mobile personal computer (ultra-mobile personal computer, UMPC), a personal digital assistant (personal digital assistant, PDA), or an in-vehicle terminal. Specific forms of the wearable device 100 and the electronic device 200 are not limited in this embodiment of this application.

The wearable device 100 may establish a wireless connection to the electronic device 200 by using a wireless communications technology. The wireless communications technology may be Bluetooth (Bluetooth, BT): classic Bluetooth or Bluetooth low energy BLE, or may be a wireless local area network (wireless local area networks, WLAN) (for example, a wireless fidelity (wireless fidelity, Wi-Fi) network), Zigbee, frequency modulation (frequency modulation, FM), near field communication (near field communication, NFC), an infrared (infrared, IR) technology, a universal 2.4G/5G frequency band wireless communications technology, or the like.

In embodiments of this application, an example in which the wireless communications technology is Bluetooth is used for description. After the wearable device 100 establishes a Bluetooth connection to the electronic device 200, if the wearable device 100 supports an HFP service, an HFP connection between the wearable device 100 and the electronic device 200 may be established. Subsequently, based on the HFP connection, the wearable device 100 is used as a Bluetooth device of the electronic device 200 to process a call service received by the electronic device 200. Call services include a first call service and a second call service. The first call service includes services such as answering a call and making a call in a call application. The second call service includes services such as a short voice message chat, an audio call, or a video call in a third-party instant messaging application (for example, "WeChat", "QQ", or a video conference application).

Generally, for a user, if the call service is the first call service, the user can process the first call service by using only the wearable device 100. If the call service is the second call service, the user needs to operate both the wearable device 100 and the electronic device 200 to complete the second call service. However, after receiving the call service, the electronic device 200 does not distinguish between call service types, that is, does not recognize whether the current call service is the first call service or the second call service. Instead, the electronic device 200 invokes, by default, the wearable device 100 that establishes the HFP connection to the electronic device 200, to process the call service. In this case, if the call service is the second call service, user experience is poor.

Based on this, two solutions are provided in the conventional technology.

Solution 1: In a case of the HFP connection, after receiving the call service, the electronic device 200 sends an eSco establishment request to the wearable device 100. The wearable device 100 agrees to the eSco establishment request, and establishes an eSco with the electronic device 200. Then, the wearable device 100 determines whether the call service being processed by the electronic device 200 is the first call service. If the call service being processed by the electronic device 200 is not the first call service, the wearable device 100 actively disconnects the eSco, so that the electronic device 200 may switch back to a speaker or a microphone of the electronic device 200 to process the second call service. However, after the eSco is established, the electronic device 200 sends audio data to the wearable device 100 based on the eSco, or waits to receive audio data sent by the wearable device 200, until the eSco is disconnected. In this process, if the user does not pay attention to the wearable device 100, the audio data sent by the electronic device 200 to the wearable device 100 is lost; or the electronic device 200 receives a voice of the user after a wait until the eSco is disconnected.

Solution 2: In a case of the HFP connection, after receiving the call service, the electronic device 200 sends an eSco establishment request to the wearable device 100. The wearable device 100 determines, based on the eSco establishment request, whether the call service being processed by the electronic device 200 is the first call service. If the call service being processed by the electronic device 200 is not the first call service, the wearable device 100 refuses to establish an eSco, so that the electronic device 200 may use a speaker or a microphone of the electronic device 200 to process the second call service. However, a process in which the wearable device 100 determines the current call service type is time-consuming.

Therefore, in some embodiments of this application, if determining that the electronic device 200 does not need to process the first call service, the wearable device 100 actively disconnects the HFP connection to the electronic device 200. In this case, when receiving the second call service, the electronic device 200 does not detect a disconnected HFP connection, but directly processes the second call service by using an audio module such as a speaker or a microphone of the electronic device 200. When receiving the first call service, the electronic device 200 notifies the wearable device 100 to reestablish the HFP connection. Then, the wearable device 100 processes the first call service based on the HFP connection. In this way, it is ensured that the user can process the first call service and the second call service easily. In addition, in a process of processing the second call service, the electronic device 200 does not cause an unnecessary delay or a call error.

Figure 2:
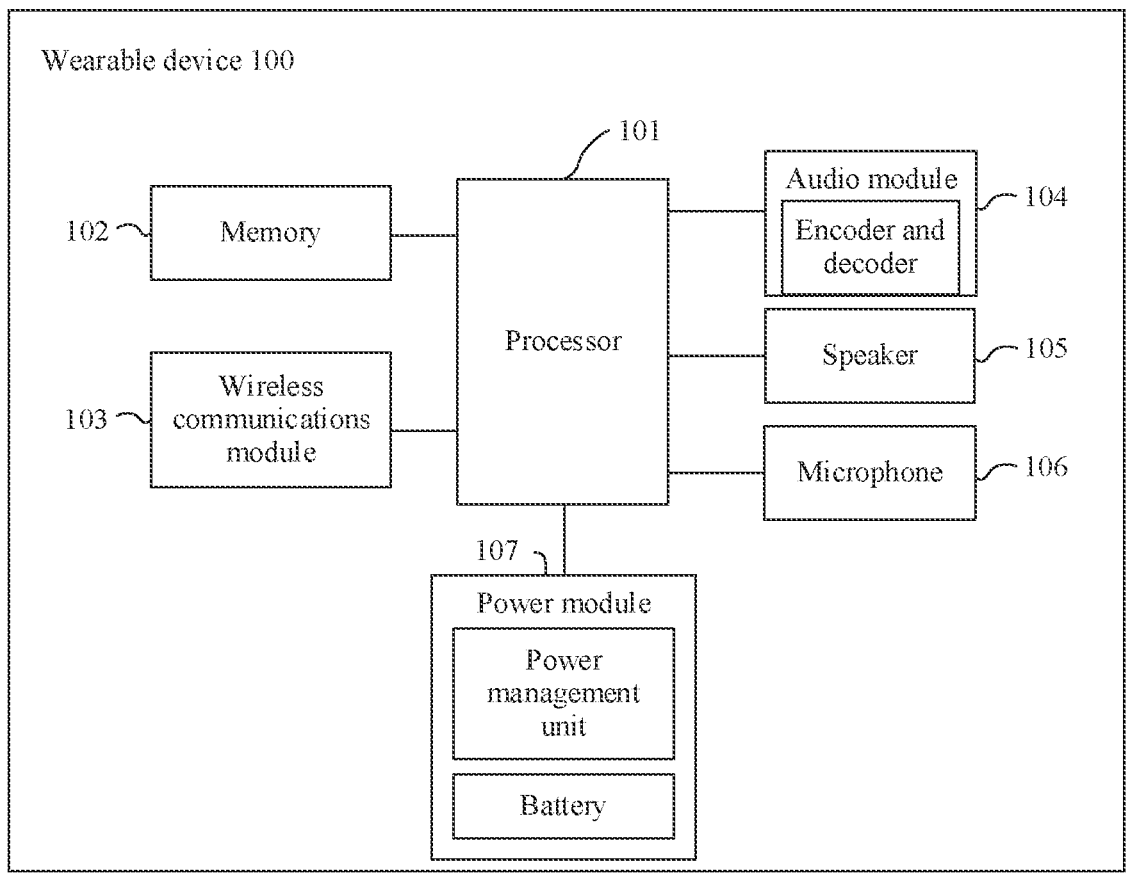
FIG. 2 is a schematic diagram of a structure of a wearable device according to an embodiment of this application.

FIG. 2 is a schematic diagram of a structure of a wearable device 100. The wearable device 100 may include at least one processor 101, at least one memory 102, a wireless communications module 103, an audio module 104, at least one speaker 105, at least one microphone 106, a power module 107, and the like.

The memory 102 may be configured to: store application program code, for example, application program code used to perform a wireless pairing connection between the wearable device 100 and an electronic device 200, so that a wireless connection is established between the wearable device 100 and the electronic device 200; process a call service of the electronic device 200; and charge the wearable device 100.

The processor 101 may be configured to execute the foregoing application program code, and invoke a related module to implement a function of the wearable device 100 in embodiments of this application. For example, functions such as a wireless Bluetooth connection, audio playing, and answering/making a call between the wearable device 100 and the electronic device 200 are implemented. For another example, the wearable device 100 receives a message sent by the electronic device 200, to determine whether a call service is a first call service.

The processor 101 may include one or more processing units. Different processing units may be independent components, or may be integrated into one or more processors 101. The processor 101 may be specifically an integrated control chip, or may include a circuit including various active components and/or passive components, and the circuit is configured to perform the functions that belong to the processor 101 and that are described in this embodiment of this application.

The wireless communications module 103 may be configured to support data exchange between the wearable device 100 and the electronic device 200 in wireless communication implemented through BT, a WLAN (for example, Wi-Fi), Zigbee, FM, NFC, IR, a universal 2.4G/5G wireless communications technology, or the like.

In some embodiments, the wireless communications module 103 may be a Bluetooth chip. The wearable device 100 may be paired with and wirelessly connected to a Bluetooth chip of the electronic device 200 by using the Bluetooth chip, to implement wireless communication between the wearable device 100 and the electronic device 200 and service processing through the wireless connection. Generally, the Bluetooth chip may support basic rate (basic rate, BR)/enhanced data rate (enhanced data rate, EDR) Bluetooth and Bluetooth low energy (Bluetooth low energy, BLE), for example, may receive/send page (page) information and receive/send a BLE advertising message. Alternatively, the Bluetooth 103 may be a Bluetooth transceiver. The wearable device 100 may establish a wireless connection to the electronic device 200 by using the Bluetooth transceiver, to implement short-range data exchange between the wearable device 100 and the electronic device 200. For example, audio data and control data are exchanged.

In addition, the wireless communications module 103 may further include an antenna, receive an electromagnetic wave signal by using the antenna, perform frequency modulation and filtering processing on the electromagnetic wave signal, and sends a processed signal to the processor 101. The wireless communications module 103 may further receive a to-be-sent signal from the processor 101, perform frequency modulation and amplification on the to-be-sent signal, and convert the signal into an electromagnetic wave for radiation through the antenna. For example, the wireless communications module 103 is used to receive a notification message sent by the electronic device 200, and a type of a call service that is being processed by the electronic device 200 is determined based on the notification message. For example, the call service that is being processed by the electronic device is the first call service or a second call service.

The audio module 104 is configured to convert digital audio information into an analog audio signal for output, and is also configured to convert analog audio input into a digital audio signal. The audio module 104 may further include an encoder and a decoder that are configured to encode and decode audio signals. In some embodiments, the audio module 104 may be disposed in the processor 101, or some functional modules in the audio module 104 are disposed in the processor 101.

The at least one speaker (speaker) 105, which may also be referred to as an "earpiece" or a "receiver", may be configured to convert an audio electrical signal into a sound signal and play the sound signal. For example, when the wearable device 100 is used as an audio output device of the electronic device 200, the speaker 105 may convert a received audio electrical signal into a sound signal and play the sound signal.

The at least one microphone (Mic) 106, which may also be referred to as a "mic" or a "mike", is configured to convert a sound signal into an audio electrical signal. For example, when the wearable device 100 is used as an audio input device of the electronic device 200, in a process in which the user speaks (for example, makes a call or sends a voice message), the microphone 106 may collect a sound signal of the user, and convert the sound signal into an audio electrical signal.

The audio electrical signal may also be described as audio data.

In some embodiments, the speaker 105 and the microphone 106 may alternatively be integrated into the audio module 104. For example, the audio module 104 may include a speaker component configured to output an audio signal, and a microphone sound pickup circuit that is configured to receive an audio signal and that cooperates with the speaker. Specific implementations of the audio module 104, the speaker 105, and the microphone 106 are not specifically limited in this embodiment of this application.

The power module 107 may be configured to provide a system power supply for the wearable device 100, supply power to each module of the wearable device 10, and support the wearable device 100 in receiving a charging input and the like. The power module 107 may include a power management unit (power management unit, PMU) and a battery. The power management unit may receive an external charging input; perform voltage transformation on an electrical signal entered from a charging path and provide a transformed electrical signal for the battery for charging; perform voltage transformation on an electrical signal provided by the battery and provide a transformed electrical signal for another module such as the wireless communications module 103 or the audio module 104; and prevent battery overcharging, over-discharging, short-circuit, overcurrent, or the like. In some embodiments, the power module 108 may further include a wireless charging coil for wirelessly charging the wearable device 100. In addition, the power management unit may be further configured to monitor parameters such as a battery capacity, a battery cycle count, and a battery health status (electric leakage or impedance).

It may be understood that the structure shown in this embodiment of this application does not constitute a specific limitation on the wearable device 100. The wearable device 100 may have more or fewer components than those shown in FIG. 2, or may combine two or more components, or may have different component configurations. For example, the wearable device 100 may further include components such as a sensor, a display (which may prompt the user with related information), and a motor. Various components shown in FIG. 2 may be implemented in hardware that includes one or more signal processing or application-specific integrated circuits, software, or a combination of hardware and software.

Figure 3A:
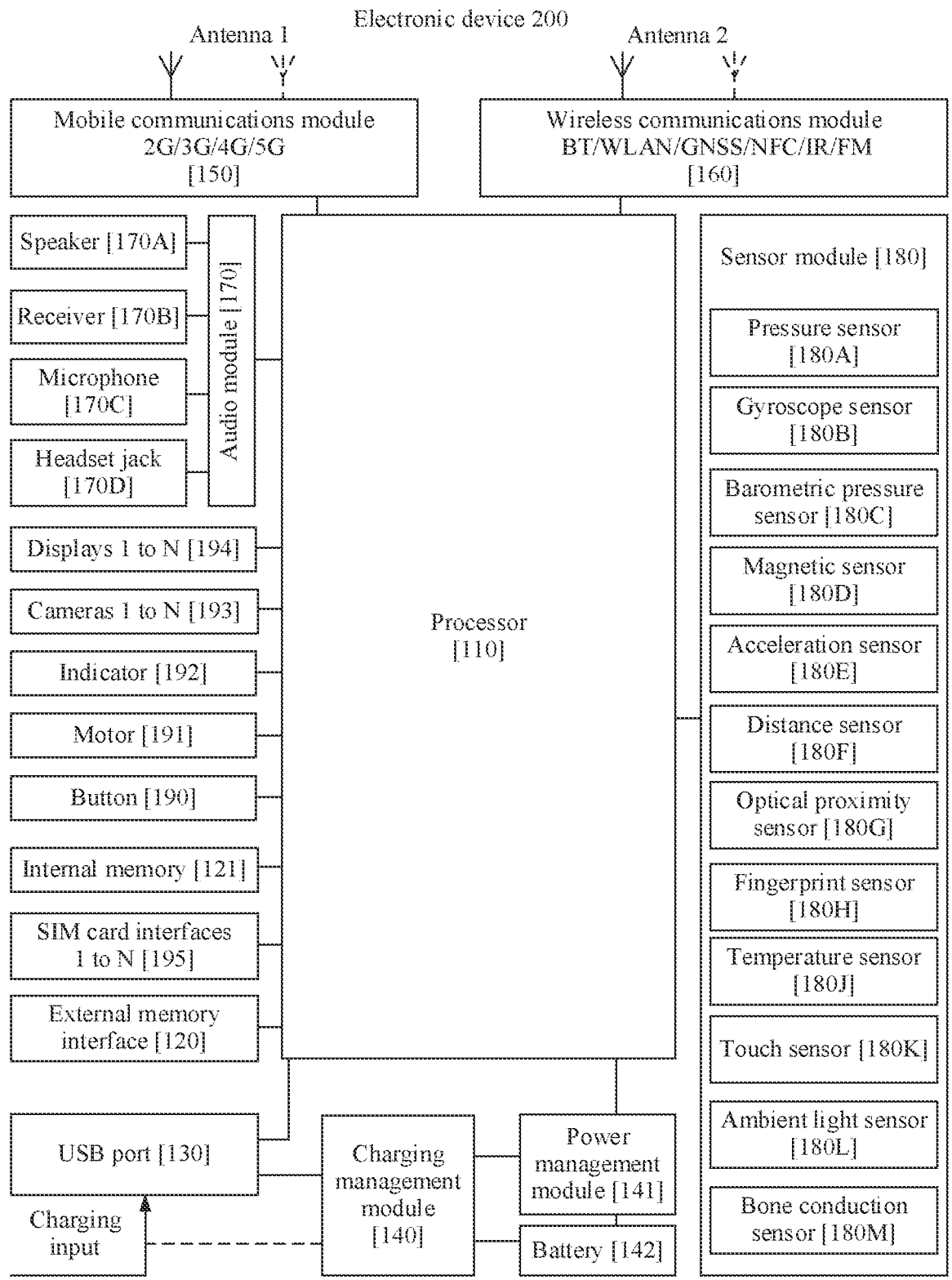
FIG. 3A is a schematic diagram of a structure of an electronic device according to an embodiment of this application.

FIG. 3A is a schematic diagram of a structure of an electronic device 200 according to an embodiment of this application.

The electronic device 200 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 200. In some other embodiments of this application, the electronic device 200 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor. DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 200.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a wearable device 100.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call by using the wearable device 100. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the wearable device 100.

The MIPI interface may be configured to connect the processor 110 to a peripheral component such as the display 194 or the camera 193. The MIPI interface includes a camera serial interface (camera serial interface. CSI), a display serial interface (display serial interface, DSI), and the like. In some embodiments, the processor 110 communicates with the camera 193 through the CSI, to implement a photographing function of the electronic device 200. The processor 110 communicates with the display 194 through the DSI interface, to implement a display function of the electronic device 200.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB port 130 is an interface that conforms to a USB standard specification, and may be specifically a mini USB port, a micro USB port, a USB Type-C port, or the like. The USB port 130 may be configured to connect to a charger to charge the electronic device 200, or may be configured to transmit data between the electronic device 200 and a peripheral device, or may be configured to connect to a headset for playing audio through the headset. The interface may be further configured to connect to another electronic device such as an AR device.

It may be understood that an interface connection relationship that is between the modules and that is shown in this embodiment of the present invention is merely an example for description, and does not constitute a limitation on the structure of the electronic device 200. In some other embodiments of this application, the electronic device 200 may alternatively use an interface connection mode different from an interface connection mode in this embodiment, or a combination of a plurality of interface connection modes.

The charging management module 140 is configured to receive a charging input from the charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input through a wireless charging coil of the electronic device 200. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 200 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 200 may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 200. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed m a same device as the mobile communications module 150 or another functional module.

The wireless communications module 160 may provide a wireless communication solution that is applied to the electronic device 200 and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processing module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 200 are coupled, and the antenna 2 and the wireless communications module 160 in the electronic device 200 are coupled, so that the electronic device 200 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 200 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), or the like. In some embodiments, the electronic device 200 may include one or N displays 194, where N is a positive integer greater than 1.

The electronic device 200 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 200 may include one or N cameras 193, where N is a positive integer greater than 1.

The digital signal processor is configured to process a digital signal, and may process another digital signal in addition to the digital image signal. For example, when the electronic device 200 selects a frequency, the digital signal processor is configured to perform Fourier transform on frequency energy and the like.

The video codec is configured to compress or decompress a digital video. The electronic device 200 may support one or more types of video codecs. In this way, the electronic device 200 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 200, such as image recognition, facial recognition, speech recognition, and text understanding.

The external memory interface 120 may be used to connect to an external memory card, for example, a micro SD card, to extend a storage capability of the electronic device 200. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and a phone book) created when the electronic device 200 is used, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs instructions stored in the internal memory 121 and/or instructions stored in the memory disposed in the processor, to perform various function applications and data processing of the electronic device 200.

The electronic device 200 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 200 may be used to listen to music or answer a call in a hands-free mode over the speaker 170A.

The receiver 170B, also referred to as an "earpiece", is configured to convert an audio electrical signal into a sound signal. When a call is answered or speech information is received by using the electronic device 200, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C by using a mouth of the user, to input a sound signal to the microphone 170C. At least one microphone 170C may be disposed in the electronic device 200. In some other embodiments, two microphones 170C may be disposed in the electronic device 200, to collect a sound signal and implement a noise reduction function. In some other embodiments, three, four, or more microphones 170C may alternatively be disposed in the electronic device 200, to collect a sound signal, implement noise reduction, and identify a sound source, to implement a directional recording function and the like.

The headset jack 170D is configured to connect to a wired headset. The headset jack 170D may be the USB port 130, or may be a 3.5 mm open mobile terminal platform (open mobile terminal platform. OMTP) standard interface or cellular telecommunications industry association of the USA (cellular telecommunications industry association of the USA, CTIA) standard interface.

The button 190 includes a power button, a volume button, and the like. The button 190 may be a mechanical button, or may be a touch button. The electronic device 200 may receive a button input, and generate a button signal input related to a user setting and function control of the electronic device 200.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 200. The electronic device 200 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external memory card. The electronic device 200 interacts with a network by using the SIM card, to implement a call function, a data communication function, and the like. In some embodiments, the electronic device 200 uses an eSIM, that is, an embedded SIM card. The eSIM card may be embedded into the electronic device 200, and cannot be separated from the electronic device 200.

A software system of the electronic device 200 may use a layered architecture, an event-driven architecture, a microkernel architecture, a microservice architecture, or a cloud architecture. In embodiments of the present invention, an Android system of a layered architecture is used as an example to illustrate a software structure of the electronic device 200.

Figure 3B:
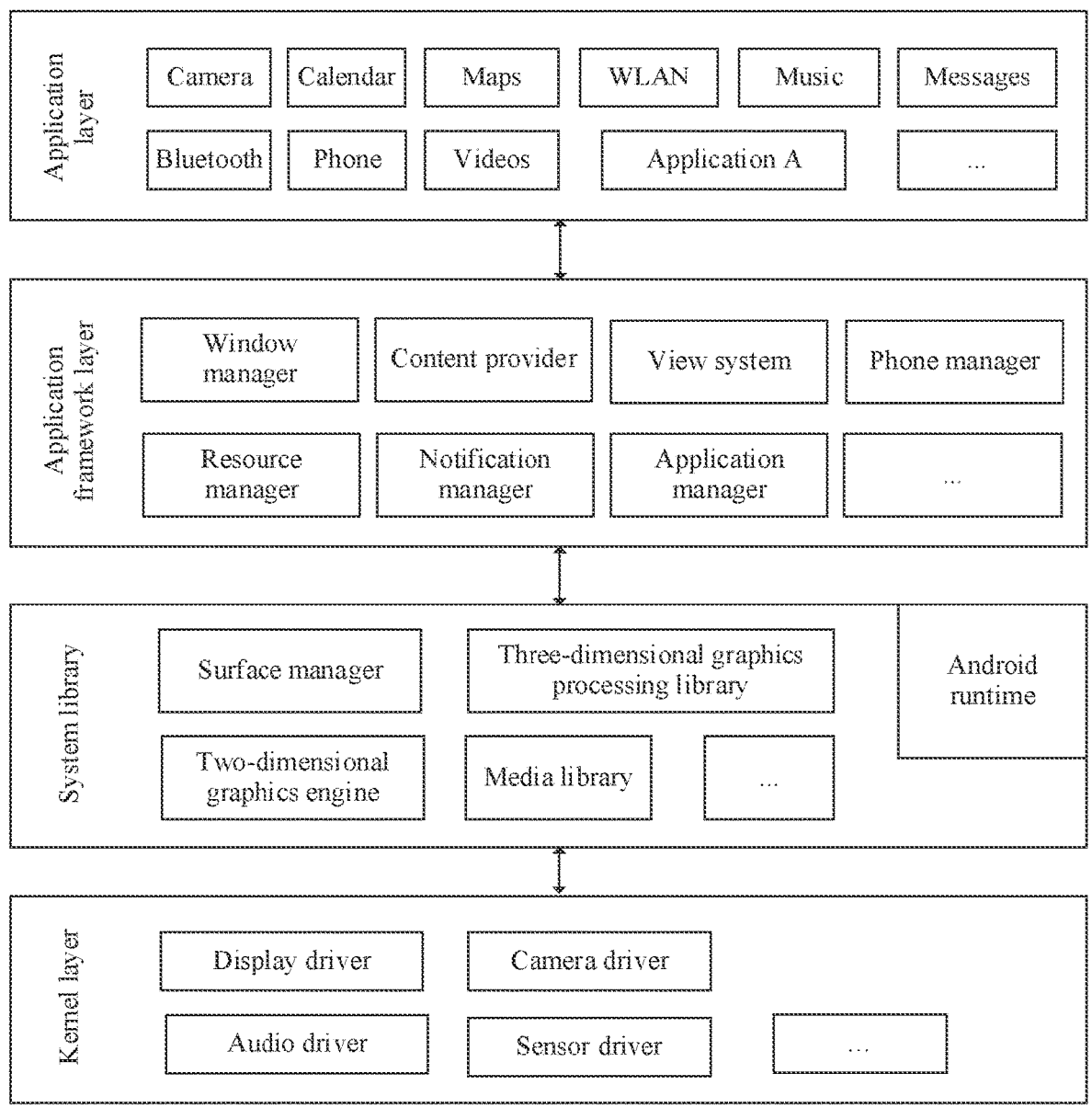
FIG. 3B is a schematic block diagram of a software structure of an electronic device according to an embodiment of this application.

FIG. 3B is a block diagram of a software structure of an electronic device 200 according to an embodiment of the present invention.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 3B, the application packages may include applications such as Camera, Calendar, Maps, Navigation, WLAN, Music, Messages, Bluetooth, Phone, and Videos.

In some embodiments, the application may further include an application A (for example, an application of a smart watch or a fitness and health application). A user may edit and manage, by using the application A, one or more wearable devices 100 connected to the electronic device 200. The application A may further support a message notification service, and send a notification message to the wearable device 100. The notification message may include, for example, a call service type of the electronic device 200.

In this way, the wearable device 100 learns the call service type of the electronic device 200 based on the received notification message.

Optionally, the wearable device 100 may disconnect an HFP connection by receiving the notification message sent by the application A, to avoid causing a delay of a second call service.

Optionally, the user may set the wearable device 100 by using the application A, for example, perform an operation such as switching a mode or adding a new device. Signaling for the setting is usually a private Bluetooth protocol.

The application framework layer provides an application programming interface (application programming interface, API) and a programming framework for an application at the application layer. The application framework layer includes some predefined functions.

As shown in FIG. 3B, the application framework layer may include a window manager, a content provider, a view system, a phone manager, a resource manager, a notification manager, an application manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 200, for example, management of a call status (including accepting, hanging up, or the like).

In some embodiments, after the electronic device 200 receives the first call service, the phone manager notifies the application A in a manner such as a broadcast message.

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The application manager may manage, for example, a lifecycle of at least one application.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG-4, H.264. MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In the following embodiments, an example in which a smart watch is used as the wearable device 100 and a mobile phone is used as the electronic device 200 is used for description.

Figure 4:
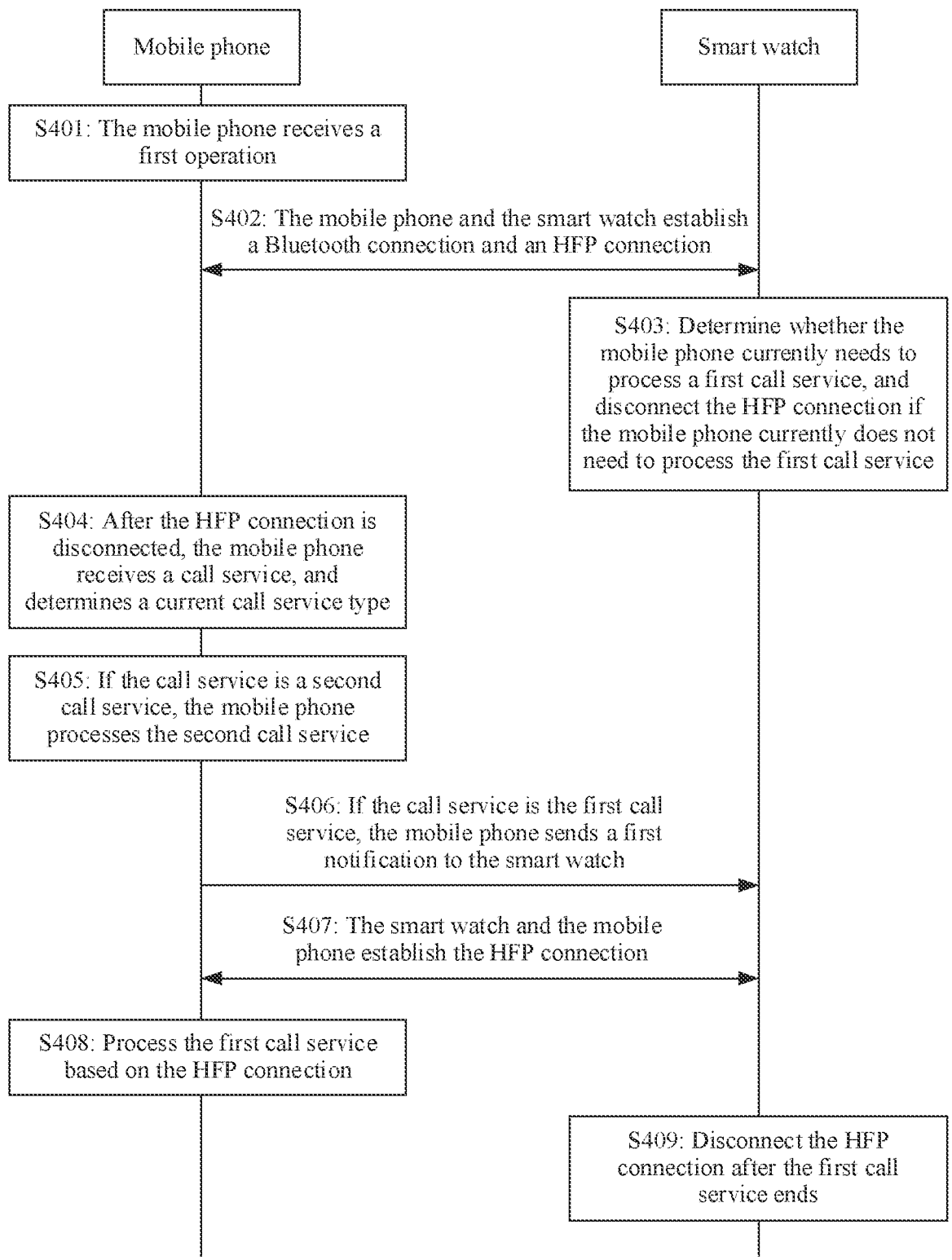
FIG. 4 is a schematic flowchart 1 of a Bluetooth communication method according to an embodiment of this application.
Figure 5A:
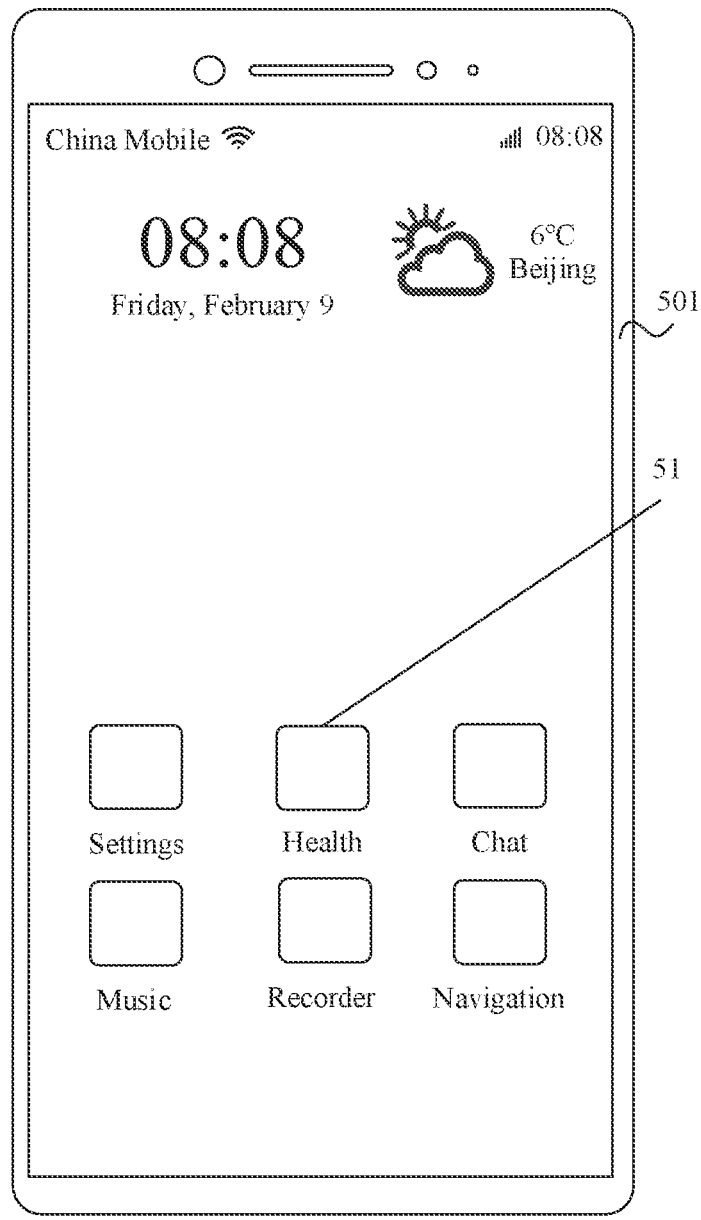
FIG. 5(a) to FIG. 5(f) are a schematic diagram 1 of an interface of an electronic device according to an embodiment of this application.
Figure 5B:
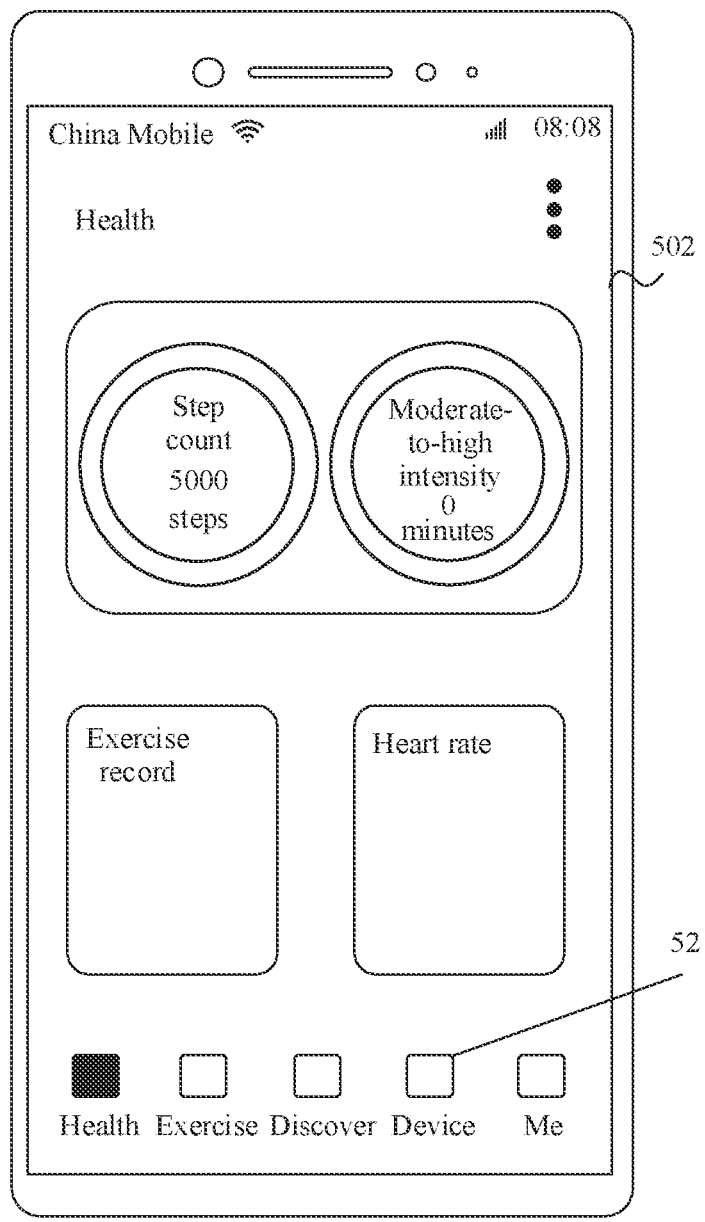
Figure 5C:
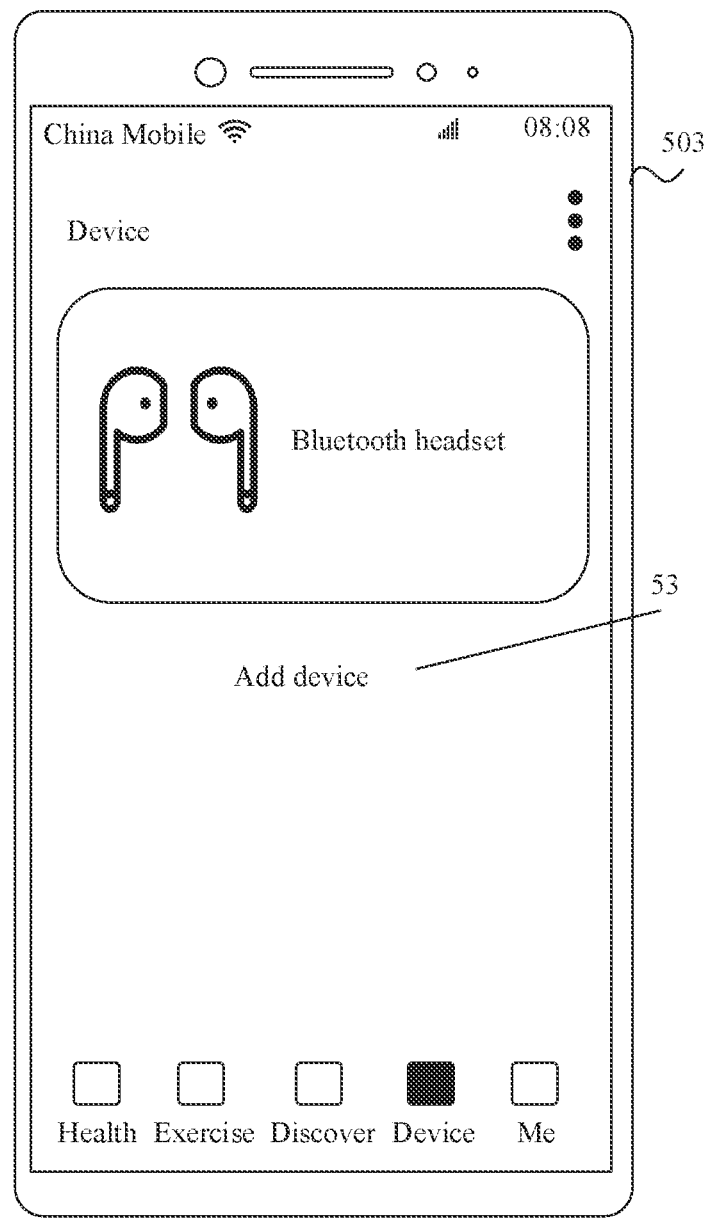
Figure 5D:
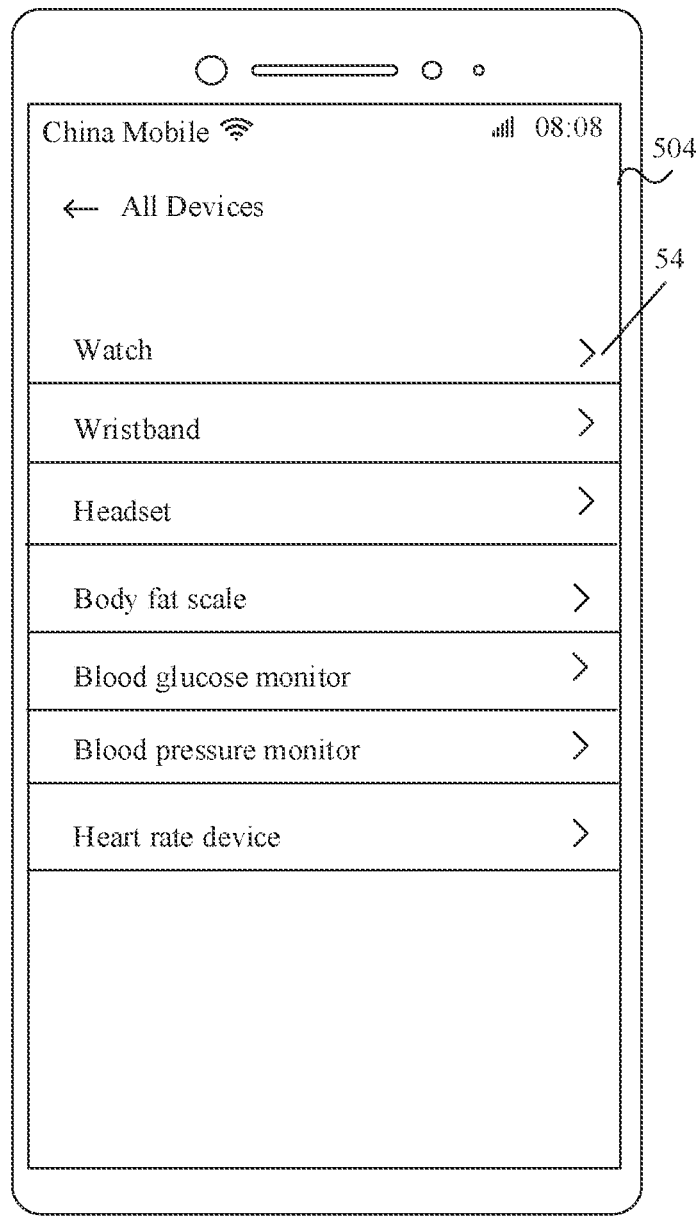
Figure 5E:
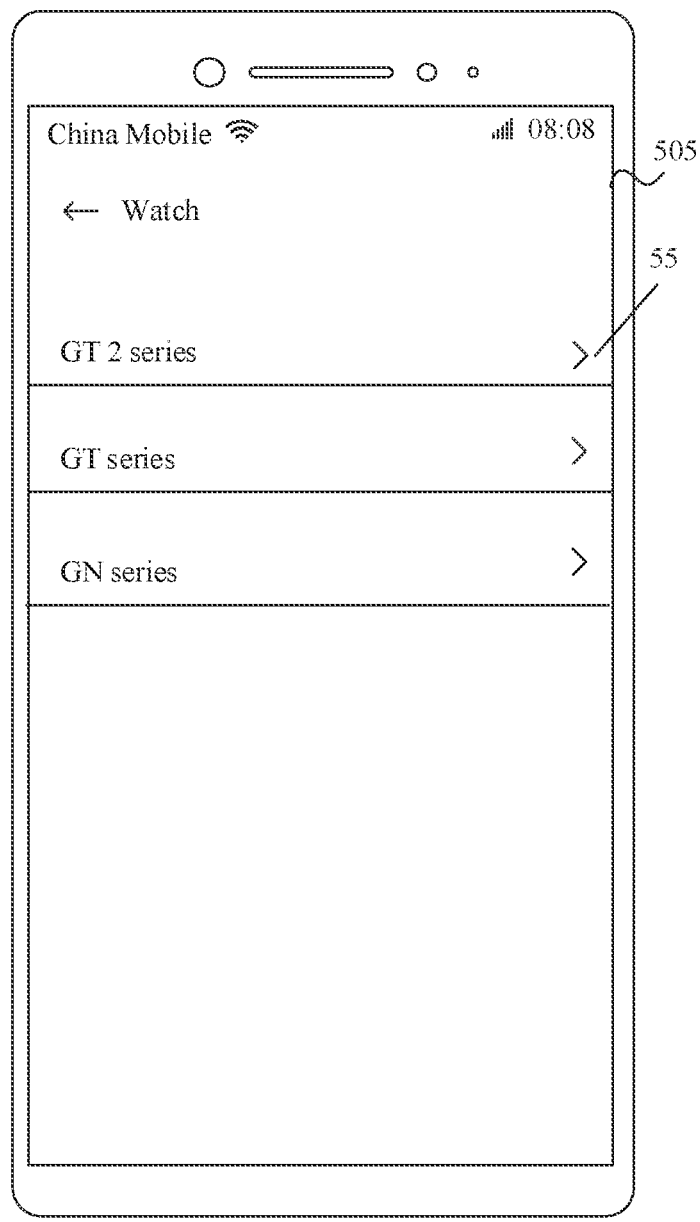
Figure 5F:
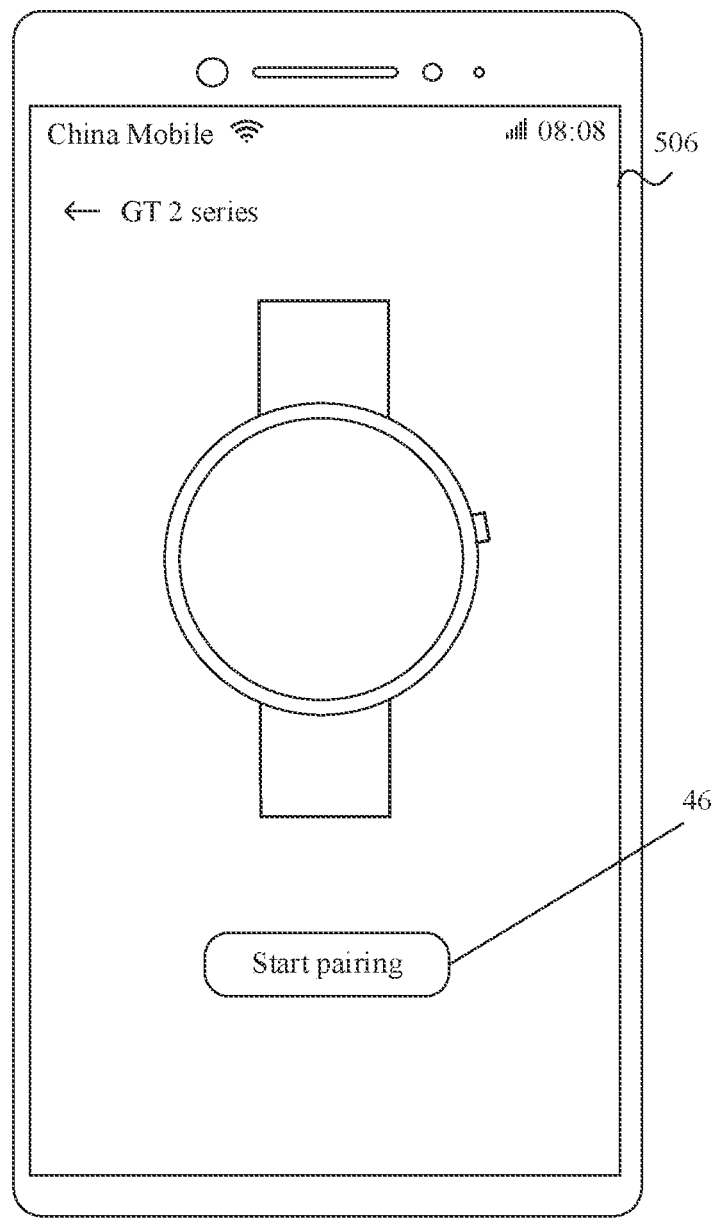

FIG. 4 is a schematic flowchart of a Bluetooth communication method according to an embodiment of this application. The method may include S401 to S409.

S401: A mobile phone receives a first operation.

The first operation is used to indicate the mobile phone to establish a Bluetooth connection to a smart watch. After detecting the first operation, the mobile phone starts a Bluetooth pairing process with the smart watch. The first operation is, for example, an operation of triggering Bluetooth pairing. For example, the first operation may include a series of detected operations for enabling Bluetooth and selecting a wearable device in a process in which the mobile phone establishes a connection to the smart watch by using an application A. For another example, the first operation may include an operation of selecting a wearable device in a Bluetooth connection process. For another example, when the smart watch and the mobile phone were paired, the mobile phone may accept an operation performed by a user on the smart watch in a "My devices" list on a Bluetooth "Settings" interface, to perform pairing.

For example, FIG. 5(*a*) shows a home screen 501 displayed by the mobile phone. In response to an operation of tapping an icon 51 of the application A (for example, a fitness and health app), the mobile phone opens the fitness and health app, and displays an interface 502 shown in FIG. 5(*b*). In response to an operation of tapping a device icon 52 by the user, a device management interface 503 shown in FIG. 5(*c*) is displayed. The user adds or deletes a device by using the device management interface 503. In response to an operation of tapping a device adding control 53 by the user, the mobile phone displays an interface 505 shown in FIG. 5(d). The mobile phone determines a device type of a to-be-connected wearable device in response to an operation of tapping an icon 54 by the user, and displays an interface 505 shown in FIG. 5(e). In response to tapping an icon 55 by the user, the mobile phone displays an interface 506 shown in FIG. 5(f). The mobile phone starts a pairing process with the smart watch in response to an operation of tapping an icon 56 by the user.

Figure 6A:
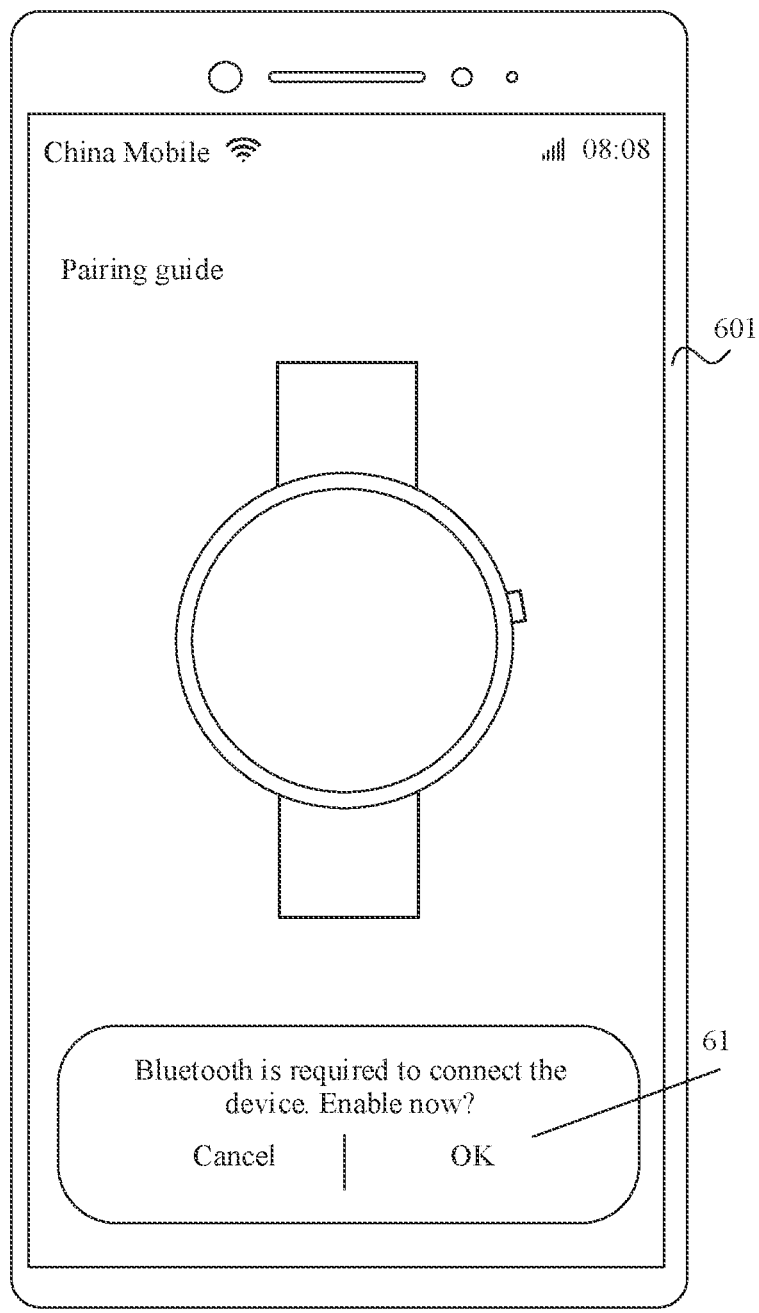
FIG. 6(a) to FIG. 6(d) are a schematic diagram 2 of an interface of an electronic device according to an embodiment of this application.

If the mobile phone does not enable Bluetooth when the mobile phone starts the pairing process with the smart watch, the mobile phone displays an interface 601 shown in FIG. 6(a), to receive the first operation. In response to an operation of tapping an "OK" icon 61 by the user, the mobile phone enables Bluetooth, searches for a smart watch that can be connected, and displays an interface 602 shown in FIG. 6(b). For example, an icon 62 displayed in the interface 602 is used to indicate that Bluetooth is enabled on the mobile phone. In response to an operation of tapping a media access control (media access control, MAC) address of a specific smart watch in a list 63 by the user, the mobile phone may establish a Bluetooth connection to the smart watch selected by the user. In other words, in a current scenario, the first operation includes an operation of tapping the icon 61 and an operation of tapping the MAC address of the specific smart watch in the list 63.

Figure 6B:
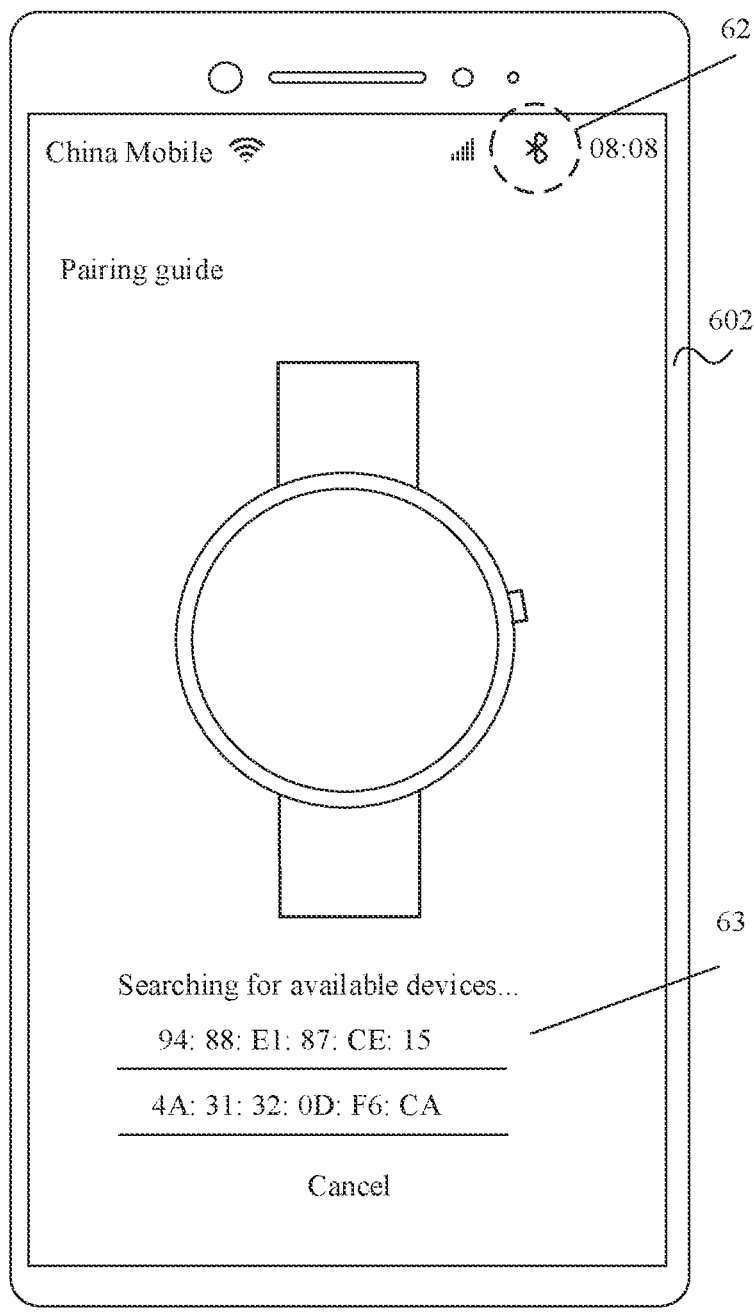

If the mobile phone has enabled Bluetooth when the mobile phone starts the pairing process with the smart watch, the mobile phone directly displays the interface 602 shown in FIG. 6(b). In this case, the first operation is an operation of tapping the MAC address of the specific smart watch in the list 63.

In some embodiments, in addition to the first operation received in the foregoing process in which the mobile phone establishes a connection to the smart watch by using the application A, the mobile phone may further enable Bluetooth in a plurality of manners to establish a Bluetooth connection to the smart watch. For example, Bluetooth is enabled by using a shortcut key, or Bluetooth is enabled by using Bluetooth settings.

Figure 7A:
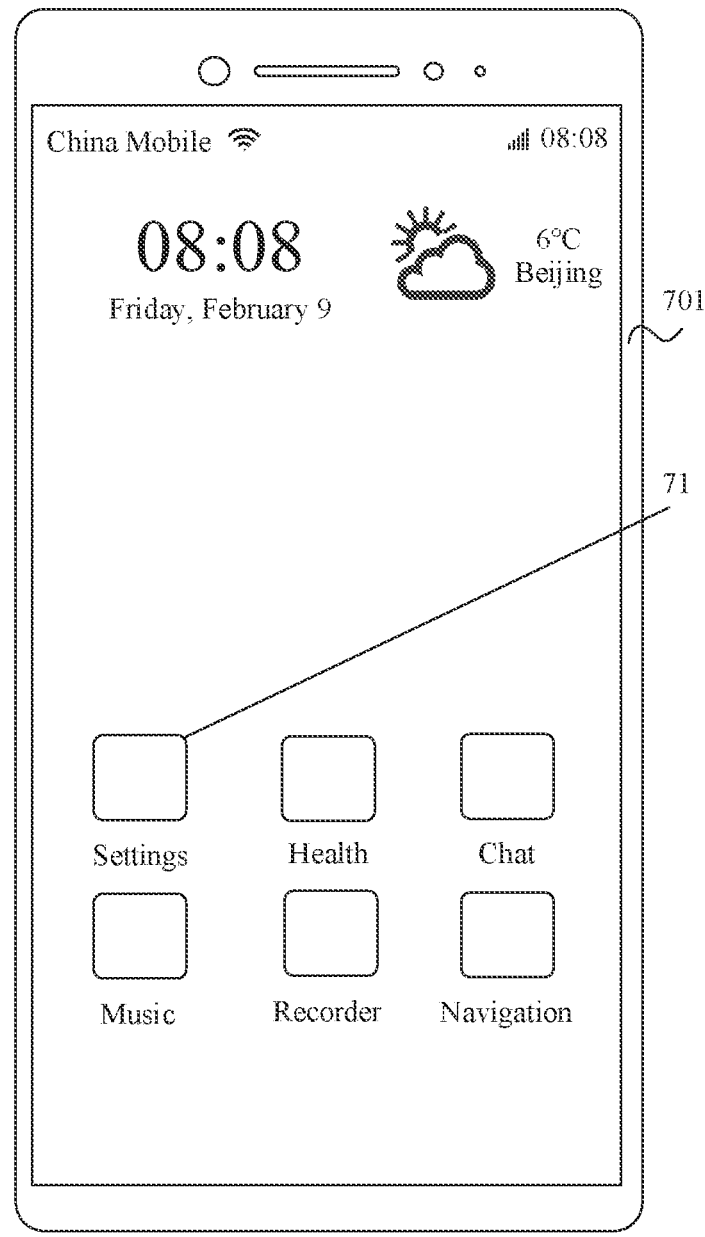
FIG. 7(a) to FIG. 7(d) are a schematic diagram 3 of an interface of an electronic device according to an embodiment of this application.
Figure 7B:
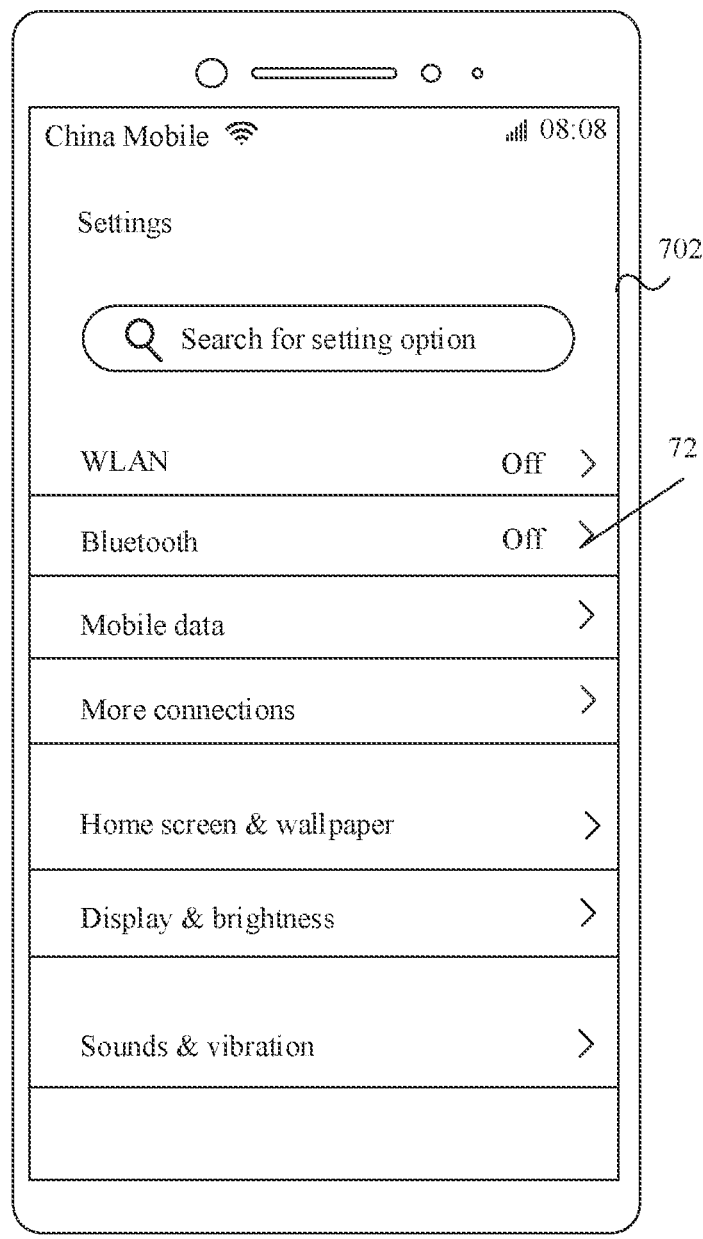
Figure 7C:
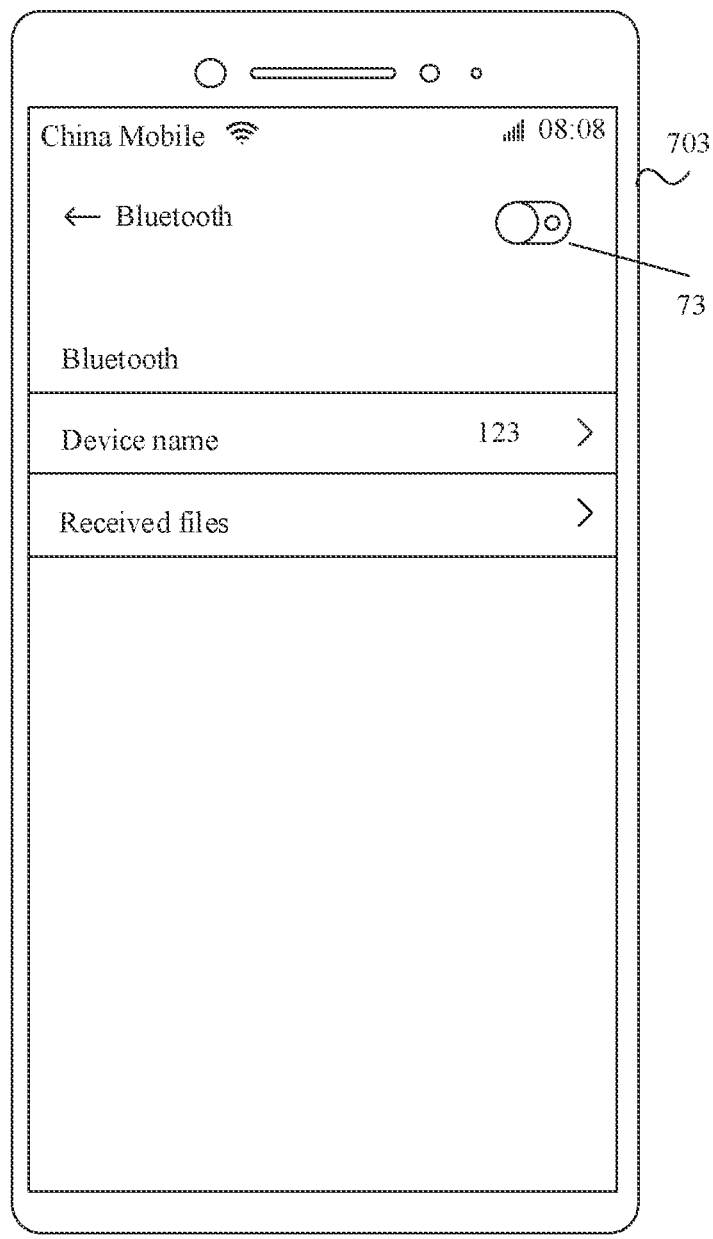
Figure 7D:
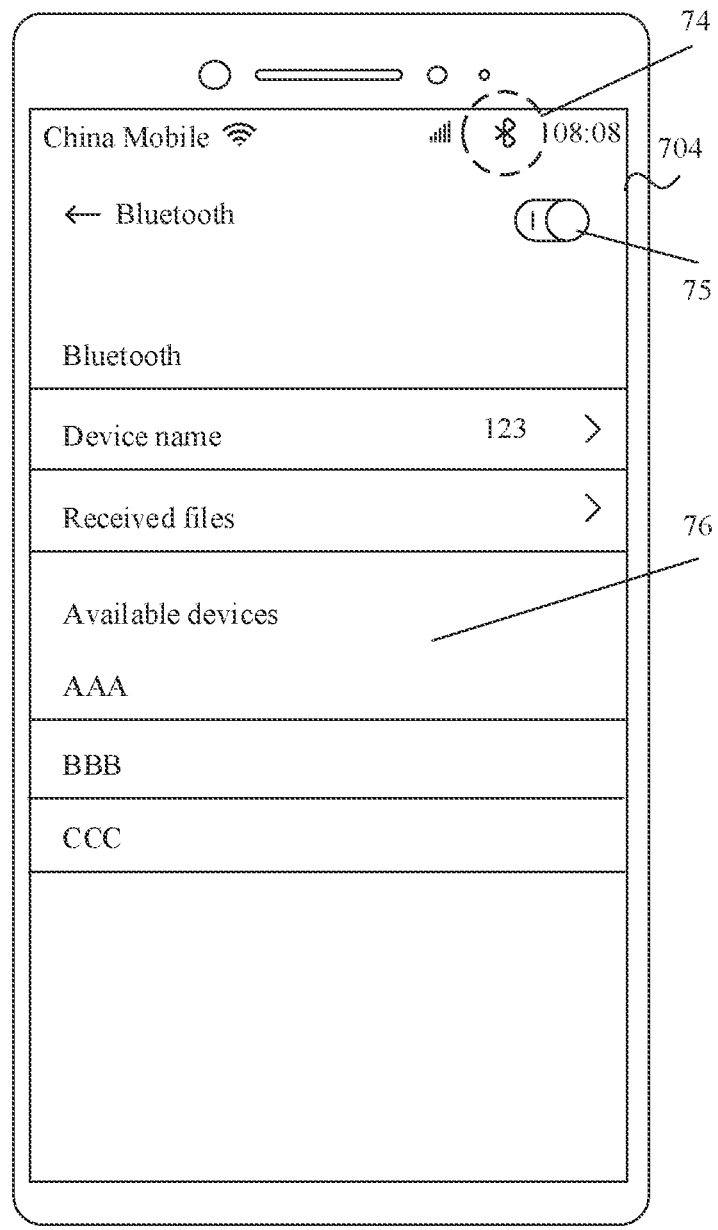

For example, the mobile phone displays a home screen 701 shown in FIG. 7(a), and displays, in response to an operation of tapping a setting icon 71 by the user, an interface 702 shown in FIG. 7(b). The mobile phone displays, in response to an operation of tapping an icon 72 by the user, a Bluetooth setting interface 703 shown in FIG. 7(c). Currently, Bluetooth of the mobile phone is disabled. In response to an operation of tapping an icon 73 by the user, the mobile phone enables Bluetooth, and displays an interface 704 shown in FIG. 7(d). For example, an icon 74 and an icon 75 in the interface 704 are used to indicate that Bluetooth is enabled. Then, the mobile phone directly establishes a Bluetooth connection to a corresponding device in response to an operation of tapping a device name in a list 76 by the user. In this case, in the current scenario, the first operation is an operation of tapping the device name in the list 76.

In some embodiments, the mobile phone may further obtain a connection by scanning a pairing QR code on the smart watch. In this case, the first operation may include an operation of scanning the pairing QR code. The mobile phone reads information included in the pairing QR code, and starts the pairing process with the smart watch.

S402: The mobile phone establishes a Bluetooth connection and an HFP connection to the smart watch.

Optionally, after detecting the first operation, the mobile phone determines a to-be-connected smart watch selected by the user, and sends a Bluetooth connection establishment request to the smart watch. After receiving a connection confirmation response from the smart watch, the mobile phone may establish the Bluetooth connection to the smart watch. In the foregoing step S401, the mobile phone starts the Bluetooth pairing process with the smart watch by using the application A. After the mobile phone establishes the Bluetooth connection to the smart watch, it indicates that the mobile phone has added the smart watch as a connected device of the application A. In this case, the mobile phone may subsequently edit the smart watch and send a notification message to the smart watch by using the application A.

In this embodiment of this application, the HFP connection may be used to establish an eSco link to transmit a voice data stream, or may be used to establish an HFP service. In this embodiment of this application, establishing the Bluetooth connection may be establishing a physical connection, for example, an asynchronous connection (asynchronous connectionless, ACL) link.

Figure 6C:
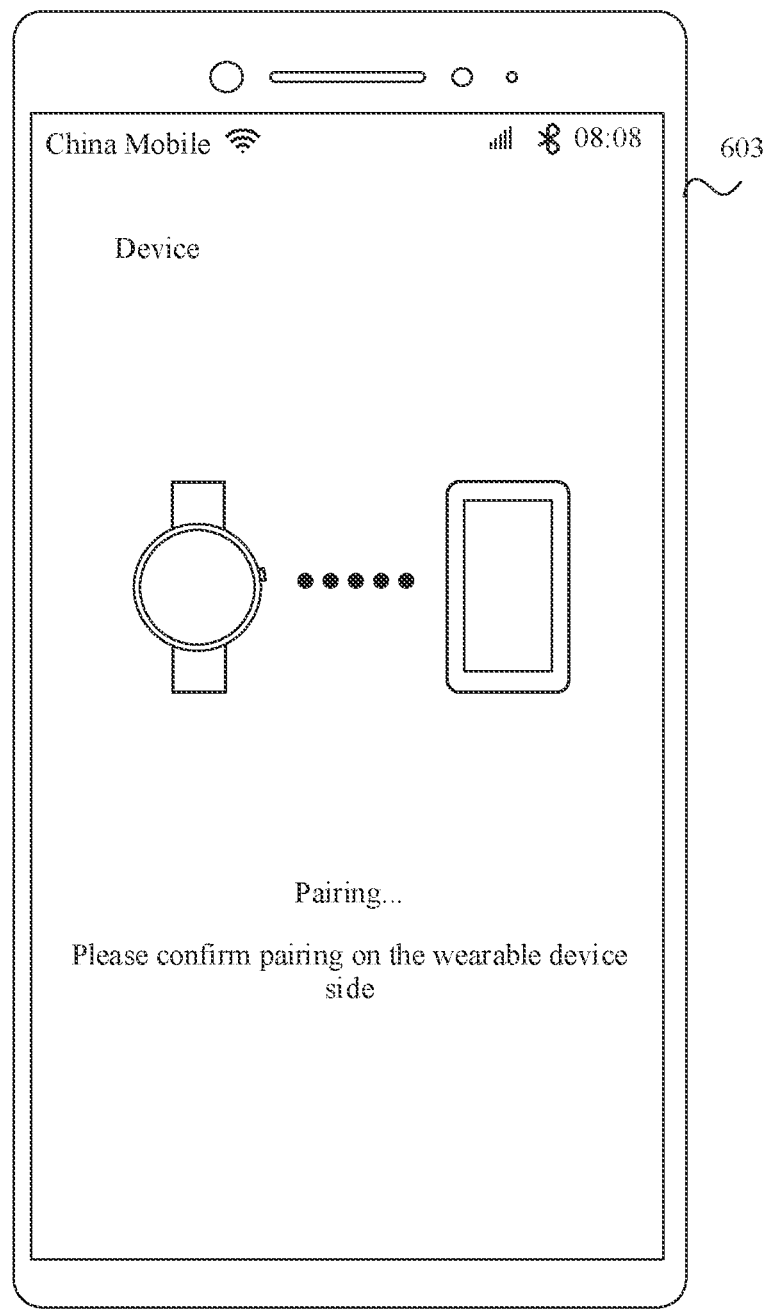
Figure 6D:
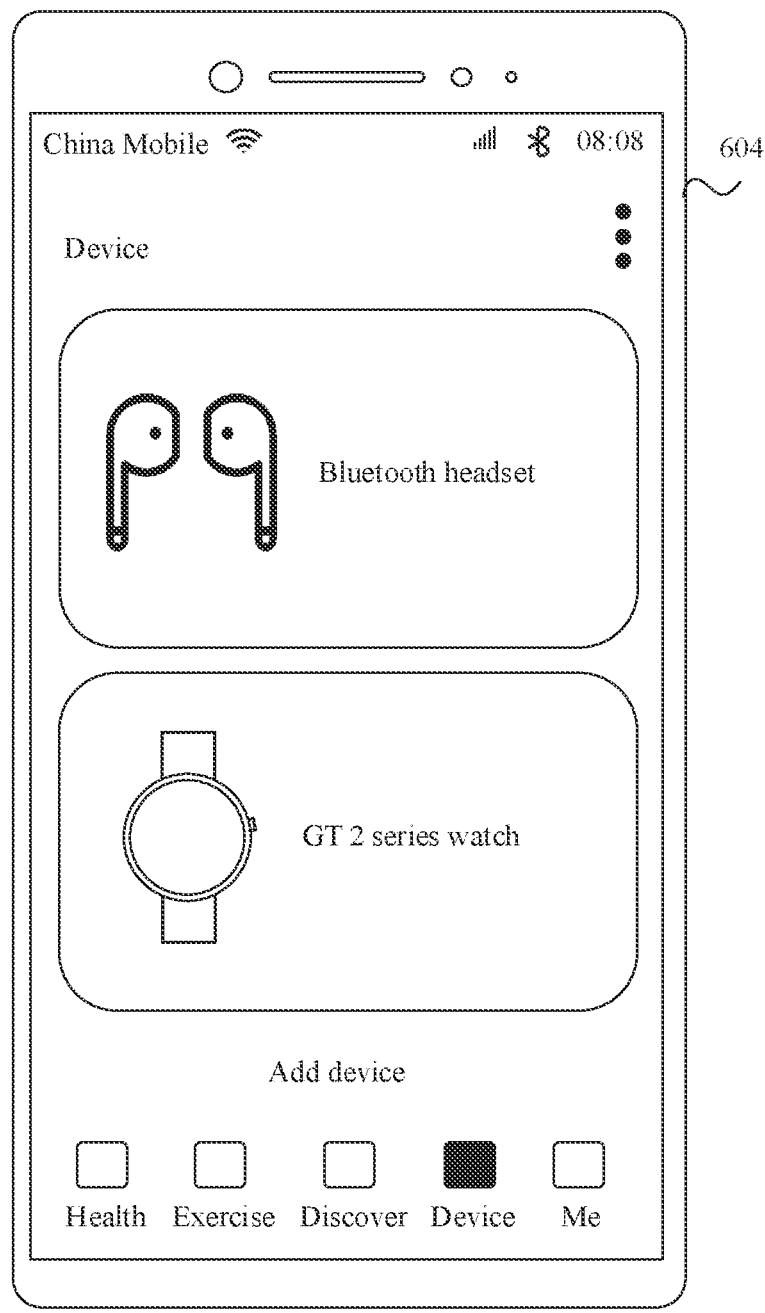

For example, the application A of the mobile phone starts the pairing process, and displays an interface 603 shown in FIG. 6(c), to prompt the user to perform confirmation on a smart watch side. After receiving the connection confirmation response sent by the smart watch, the mobile phone displays a device management interface 604 shown in FIG. 6(d), and displays the added smart watch in the device management interface 604.

Figure 8:
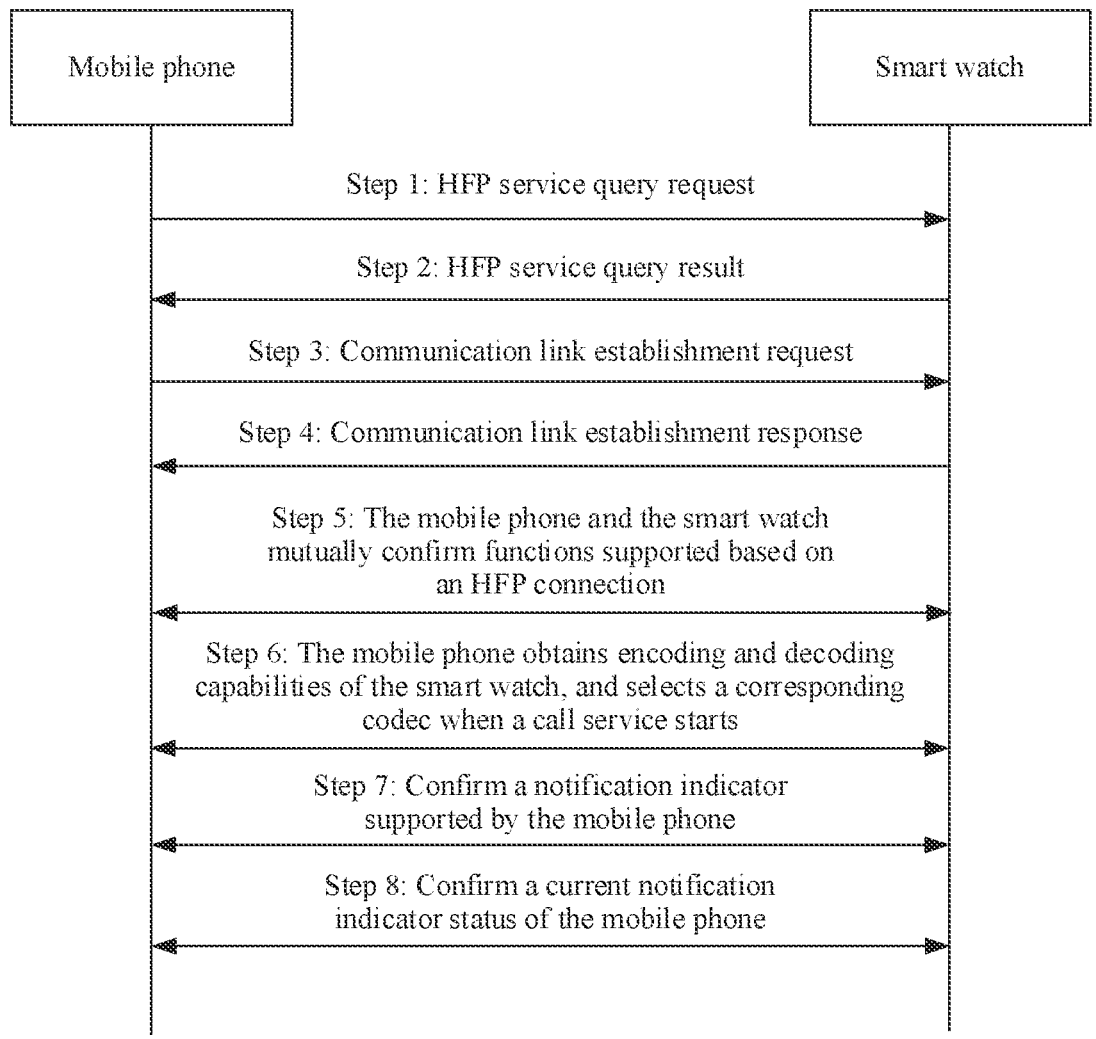
FIG. 8 is a schematic flowchart of establishing an HFP connection according to an embodiment of this application.

Optionally, after detecting a Bluetooth enabling operation, the mobile phone starts, based on the established Bluetooth connection, a hands-free protocol (hands-free protocol, HFP) connection establishment process with the smart watch. As shown in FIG. 8, the process of establishing the HFP connection may include the following step 1 to step 8.

Step 1: The mobile phone sends an HFP service query request to the smart watch.

Step 2: The smart watch sends an HFP service query result to the mobile phone.

Optionally, in the foregoing step 1 and step 2, if the mobile phone needs to establish the HFP connection to the smart watch, the mobile phone needs to send the HFP service query request to the smart watch, to determine whether the smart watch supports an HFP service. The HFP service means that the smart watch can support a Bluetooth hands-free function, and control a call of the mobile phone, for example, accepting, hanging up, or declining the call. After receiving the HFP service query request sent by the mobile phone, the smart watch determines whether the HFP service is supported.

If the smart watch supports the HFP service, the smart watch sends basic information (profile information) of the HFP service to the mobile phone. The profile information includes, for example, a protocol version number, an RFCOMM protocol channel (channel) number, and the like.

If the smart watch does not support the HFP service, the query result returned to the mobile phone is null. After receiving the query result, the mobile phone determines that the smart watch does not support the HFP service, and stops establishing the HFP connection.

In some embodiments, the mobile phone sends a capability query request to the smart watch, to query a service supported by the smart watch. For example, the capability query request may be sent to the smart watch by using the service discovery protocol (service discover protocol, SDP). In response to the request, the smart watch sends, to the mobile phone, a capability supported by the smart watch, including but not limited to services such as HFP and an advanced audio distribution profile (advanced audio distribution profile, A2DP).

Step 3: The mobile phone sends a communication link establishment request to the smart watch.

Step 4: The smart watch sends a communication link establishment response to the mobile phone.

Optionally, in the foregoing step 3 and step 4, after receiving the profile information, the mobile phone determines that the smart watch supports the HFP service, and establishes a communication link, for example, an RFCOMM protocol-based communication link, to the smart watch based on the profile information.

The foregoing step 1 to step 4 may also be described as a pairing process between the mobile phone and the smart watch. After the mobile phone is successfully paired with the smart watch, the smart watch completes initialization of a service level connection (service level connection. SLC) by using the following step 5 to step 8, to complete the HFP connection establishment process. The mobile phone and the smart watch transmit an interaction command by using the established communication link, to complete an SLC initialization process.

Step 5: The mobile phone and the smart watch mutually confirm functions supported based on the HFP connection.

Optionally, the smart watch sends an AT+BRSF command to the mobile phone, to notify the mobile phone of functions supported by the smart watch in a case in which the HFP connection is established. After confirmation, the mobile phone returns a +BRSF command to the smart watch, that is, returns a confirmation response. Through AT command interaction, the mobile phone and the smart watch confirm functions that can be implemented by both parties based on the HFP connection. For example, a notification of a call service status, a three-way calling function, an incoming call ringing notification, volume control, and the like may be included.

Step 6: The mobile phone obtains encoding and decoding capabilities of the smart watch, and selects a corresponding codec when a call service starts.

Optionally, the smart watch sends a command AT+BAC=<u1, u2, . . . > to the mobile phone, to notify the mobile phone of the encoding and decoding capabilities of the smart watch. For example, the capabilities may include broadband encoding and decoding capabilities, narrowband encoding and decoding capabilities, and the like. The mobile phone selects, based on the encoding and decoding capabilities of the smart watch, the corresponding codec when the call service starts, to implement a subsequent information interaction process with the smart watch.

Step 7: Confirm a notification indicator supported by the mobile phone.

Optionally, the smart watch sends a command AT+CIND=? to the mobile phone. The command is used to query the notification indicator (indicator) supported by the mobile phone. That is, a notification function supported by the mobile phone and a corresponding indicator are queried. The mobile phone sends a command+CIND to the smart watch, to notify the smart watch of a list of indicators currently supported by the mobile phone.

For example, the mobile phone supports sending of a status corresponding to a call service to the smart watch after the call service is received, and the indicator list includes the status that is corresponding to the call service and that can be notified. For another example, for a message notification service between the mobile phone and the smart watch, the mobile phone supports sending of a notification message to the smart watch. Correspondingly, the smart watch supports the message notification service, and may receive and parse the notification message sent by the mobile phone.

Step 8: Confirm a current notification indicator status of the mobile phone.

Optionally, the smart watch sends a command AT+CIND? to the mobile phone. The command is used to query the current notification indicator status of the mobile phone. The mobile phone returns a command+CIND to the smart watch. The command includes the current notification indicator status of the mobile phone.

For example, the smart watch determines, based on the command+CIND, that the mobile phone is processing a call service, and a status corresponding to the call service is a dialing state.

Steps 1 to 8 are the HFP connection establishment process initiated by the mobile phone. Correspondingly, the smart watch may also initiate an HFP connection establishment process.

For example, the smart watch detects an operation of enabling Bluetooth, and actively sends the profile information to the mobile phone, to establish a communication link. Then, the HFP connection establishment process is completed by using the foregoing step 5 to step 8. For a specific HFP connection establishment process, refer to the conventional technology. Details are not described herein.

It should be noted that, after the smartphone is powered on, the smart watch initializes the HFP service and the message notification service. In other words, an identifier of the HFP service and an identifier of the message notification service are added to a list of services supported by the smart watch. Subsequently, by querying the service list, it may be learned that the smart watch supports the HFP service and the message notification service.

Optionally, after the Bluetooth connection is established between the mobile phone and the smart watch, the mobile phone may send the notification message to the smart watch in a Bluetooth wireless transmission manner.

For example, the application A that is used to connect to a wearable device and that is in the mobile phone supports the message notification service, and the mobile phone may send the notification message to the smart watch by using the application A. The application A may be the fitness and health app shown in FIG. 5(a) to FIG. 5(f).

Figure 9:
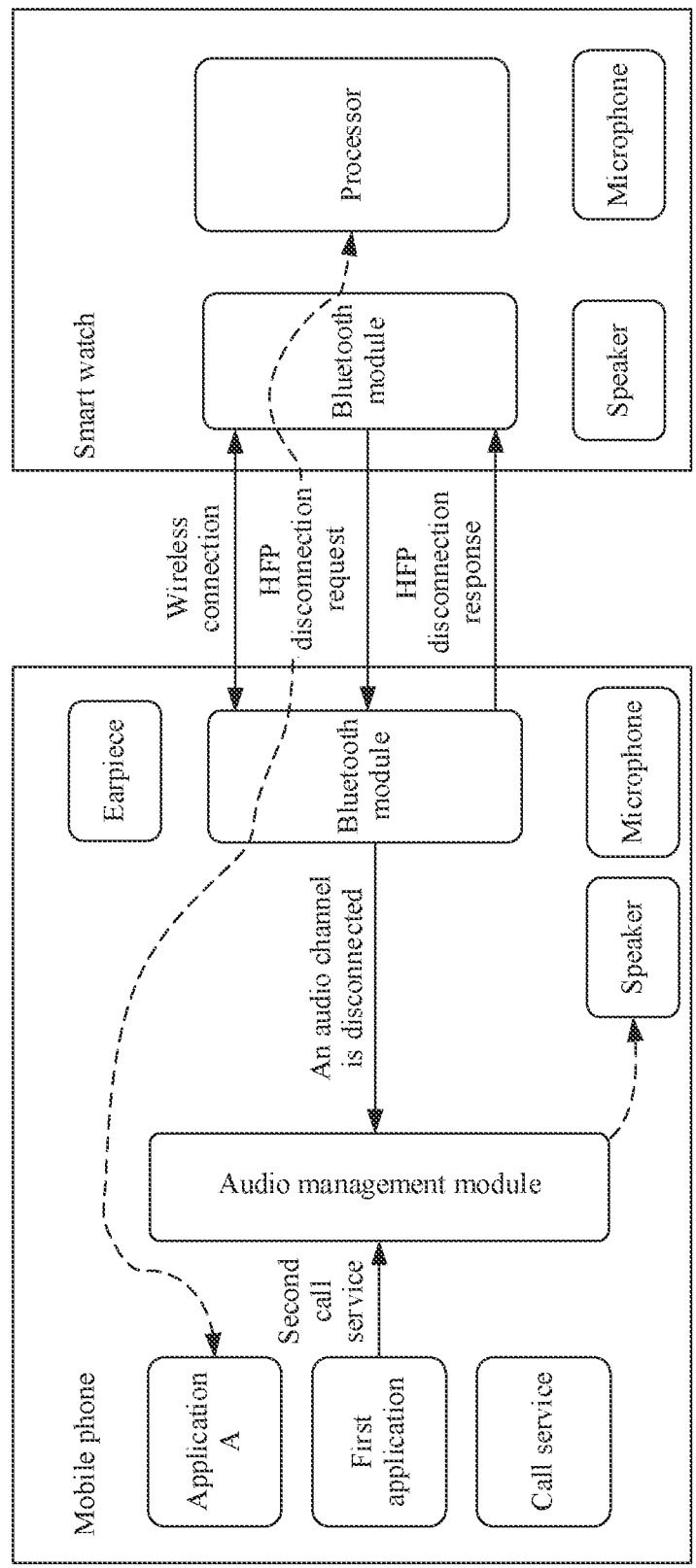
FIG. 9 is a schematic diagram 1 of an application scenario of a Bluetooth communication method according to an embodiment of this application.

For example, as shown in FIG. 9, the mobile phone and the smart watch establish a wireless connection in a Bluetooth connection manner. The HFP connection is established between the mobile phone and the smart watch. The application A of the mobile phone sends the notification message to the smart watch in the Bluetooth transmission manner. After being processed by a processor of the smart watch, content of the notification message is confirmed, and a corresponding action is performed.

It may be understood that the structure shown in FIG. 9 does not constitute a specific limitation on the mobile phone and the smart watch. The mobile phone and the smart watch may have more or fewer components than those shown in FIG. 9, may combine two or more components, or may have a different component configuration.

S403: The smart watch determines whether the mobile phone currently needs to process a first call service. If the mobile phone currently does not need to process the first call service, the HFP connection is disconnected.

Optionally, the smart watch determines, based on the HFP connection, whether the mobile phone currently needs to process the first call service. If the mobile phone currently does not need to process the first call service, the smart watch sends an HFP disconnection request to the mobile phone. After receiving the HFP disconnection request, the mobile phone disconnects the HFP connection, and sends a response to the smart watch. If the mobile phone currently needs to process the first call service, the smart watch sends an HFP disconnection request to the mobile phone after processing of the first call service is completed, to disconnect the HFP connection to the mobile phone.

For example, as shown in FIG. 9, the smart watch sends the HFP disconnection request to a Bluetooth module of the mobile phone by using a Bluetooth module. After disconnecting the HFP connection, the mobile phone sends an HFP disconnection response to the smart watch. In addition, the Bluetooth module of the mobile phone notifies an audio management module that an audio channel between the mobile phone and the smart watch is currently disconnected. Subsequently, based on an HFP disconnection status, the audio management module determines that the audio channel between the Bluetooth module of the mobile phone and the Bluetooth module of the smart watch is disconnected, and does not send a call task to the Bluetooth module of the mobile phone. In other words, the smart watch is not used to process a call service.

In a possible implementation, the smart watch may determine, by querying a status corresponding to a call service, whether the mobile phone currently needs to process the first call service. For example, if the mobile phone receives the call service, the mobile phone sends, based on the HFP connection, a call status parameter to the smart watch that establishes the HFP connection to the mobile phone, so that the smart watch determines a type of the call service. Subsequently, the smart watch invokes an AT instruction to query a status parameter corresponding to a current call service of the mobile phone, to determine a current call service type of the mobile phone. For example, the AT instruction is an instruction AT+CLCC, which is used to list a current call.

The following Table 1 shows a query result of the instruction AT+CLCC and a meaning of the query result. The first call service corresponds to a plurality of states. That is, if the call service is the first call service, the query result is one or more results in 1 to 6. Because a status of a second call service is updated quickly, a corresponding query result is configured to be 0. That is, if the call service is the second call service, the query result is 0. The smart watch may determine, based on the query result, whether the mobile phone currently needs to process the first call service. It may be understood that, if the instruction AT+CLCC has no corresponding query result, it indicates that the mobile phone currently has no call service. In this case, the smart watch may send the HFP disconnection request to the mobile phone.

TABLE 1

| Query result | Corresponding state |
| --- | --- |
| 0 | Active (Active) |
| 1 | Held (Held) |
| 2 | Dialing (Dialing) |
| 3 | Alerting (Alerting) |
| 4 | Incoming (Incoming) |
| 5 | Waiting (Waiting) |
| 6 | Call held by Response and Hold (Call held by Response and Hold) |

It should be noted that, a call service provided in a common third-party instant messaging application is the second call service, and when the mobile phone receives the call service triggered by the third-party instant messaging application, the active state in the foregoing Table 1 is correspondingly generated. However, if a plurality of states are correspondingly generated in a process in which the mobile phone processes a call service triggered by a specific third-party instant messaging application, the call service provided by this type of third-party instant messaging application also belongs to the first call service.

It should be noted that a wearable device, for example, a Bluetooth headset, that can be used to process the second call service may be preconfigured to facilitate a call of the user. This type of wearable device does not need to send the HFP disconnection request to the mobile phone, that is, does not need to actively disconnect the HFP connection.

For example, the user may wear the Bluetooth headset on an ear. In a process of processing the second call service, the user can process the second call service by operating only the mobile phone. In this case, the Bluetooth headset may be preconfigured as the wearable device that can process the second call service, and does not need to actively disconnect the HFP connection to the mobile phone.

S404: After disconnecting the HFP connection, the mobile phone receives the call service, and determines the current call service type. If the service is the second call service, step S405 is performed. If the service is the first call service, step S406 is performed.

The call service type includes the first call service and the second call service. The first call service includes services such as answering a call and making a call in a call application. The second call service includes services such as a short voice message chat, an audio call, or a video call in a third-party instant messaging application (for example, "WeChat", "QQ", or a video conference application).

Optionally, after receiving the first call service, the mobile phone sends a system broadcast message to notify each registered application module that the mobile phone currently receives the first call service. The application A of the mobile phone needs to register to listen to the broadcast message, to determine the current call service type of the mobile phone. If receiving the broadcast message, the application A determines that the call service currently received by the mobile phone is the first call service.

Optionally, the mobile phone may further determine the call service type by detecting a second operation. The second operation is used to indicate to perform the call service. For example, the second operation is an operation of making a call or answering a call. When detecting the second operation, the mobile phone determines that the mobile phone receives the first call service. For another example, the second operation is an operation of playing a short voice or recording a short voice. When detecting the second operation, the mobile phone determines that the mobile phone receives the second call service.

In some embodiments, the mobile phone may further determine the call service type in another manner. For example, a hardware status of the mobile phone is monitored, to learn of the type of the call service received by the mobile phone. For example, in a manner of monitoring a change of a user interface (user interface, UI), a change of a speaker status, a change of a microphone status, or the like of the mobile phone, it is determined that a current call service is the first call service or the second call service. For example, the UI interface of the first call service of the mobile phone is a call function interface, for example, a call answering page. If it is monitored that the UI interface of the mobile phone is switched to be displayed as the call answering page, it is determined that the type of the call service currently received by the mobile phone is the first call service.

S405: If the call service is the second call service, the mobile phone processes the second call service.

Optionally, as described in the foregoing step S403, the smart watch has disconnected the HFP connection to the mobile phone. In this case, as shown in FIG. 9, when the mobile phone receives a second call service generated by a first application, the audio management module detects a module that can be currently used for voice playing or recording. If the audio management module determines that no device in a Bluetooth connection currently exists, the audio management module does not invoke the Bluetooth module to process the second call service. The audio management module invokes an audio module of the mobile phone to process the call service. For example, the audio management module invokes a speaker to play a sound. Alternatively, a microphone is invoked to record a voice. The first application is, for example, a third-party instant messaging application, and the second call service includes, for example, playing audio of the first application, recording audio, a video call, an audio call, or the like.

Figure 10A:
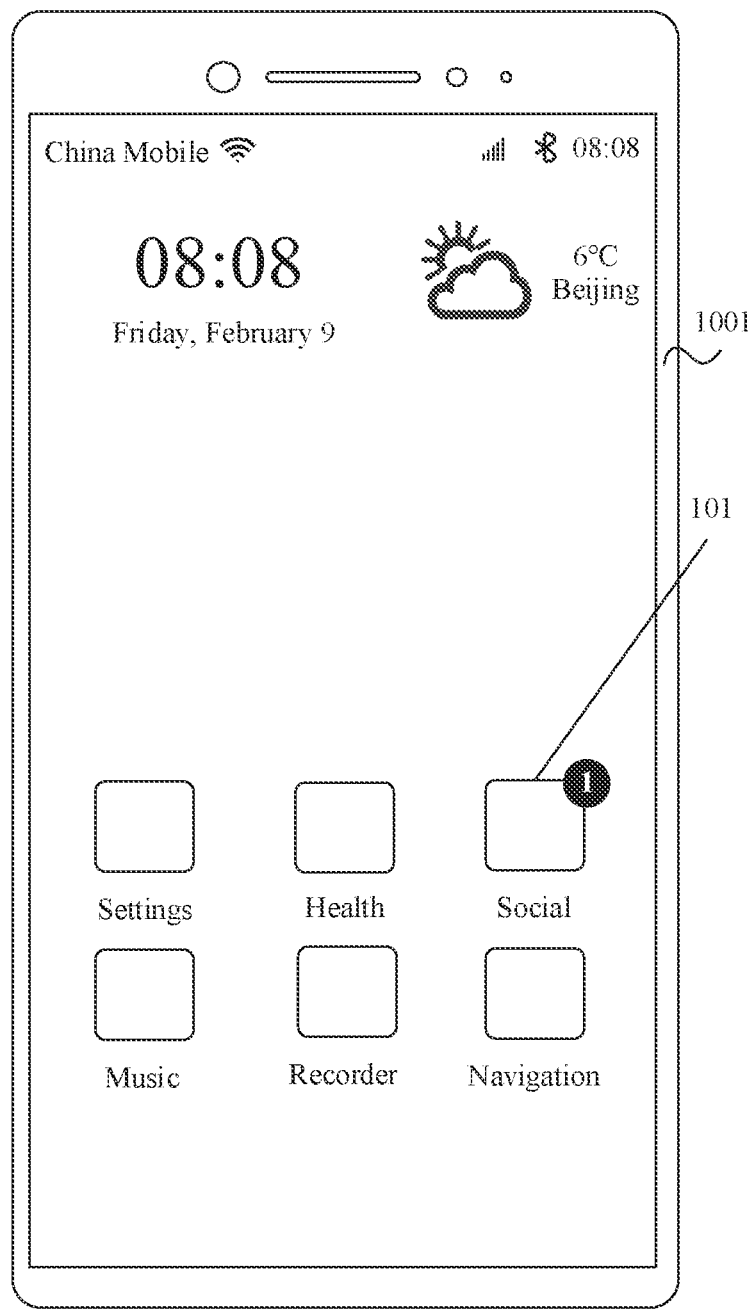
FIG. 10(a) to FIG. 10(e) are a schematic diagram 4 of an interface of an electronic device according to an embodiment of this application.
Figure 10B:
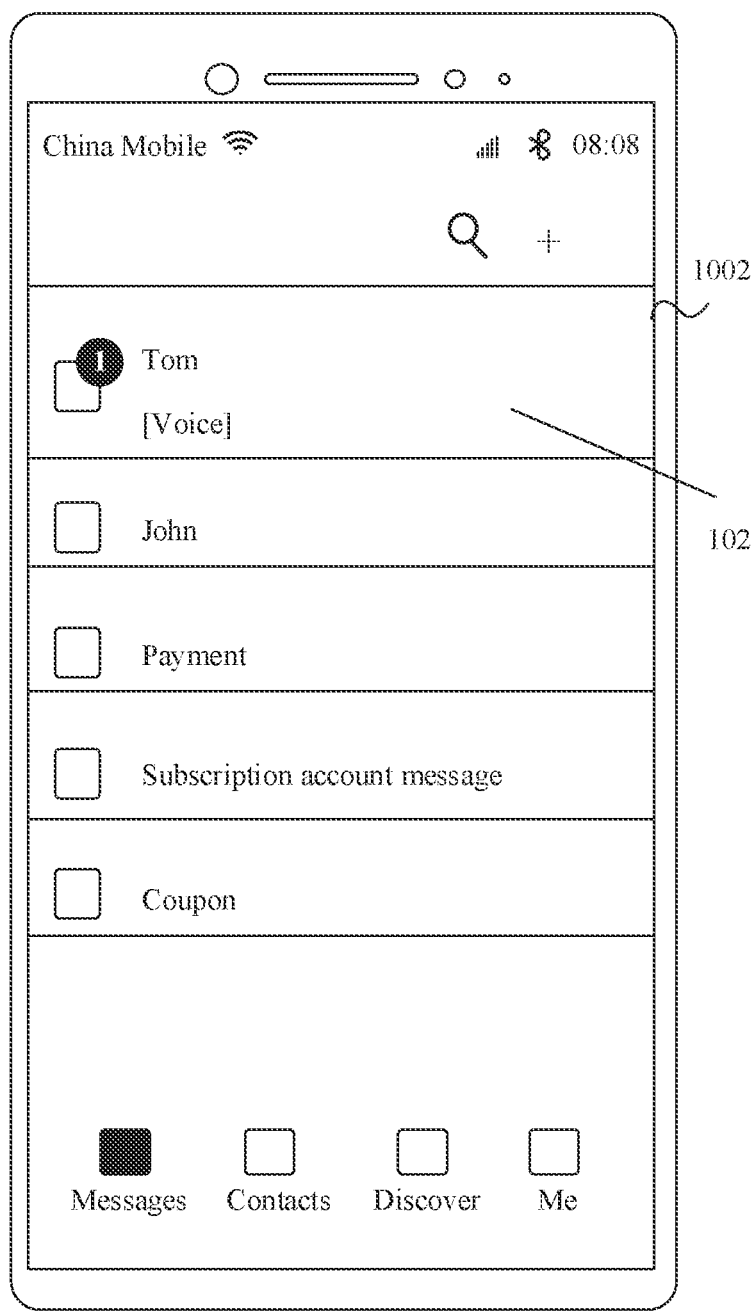
Figure 10C:
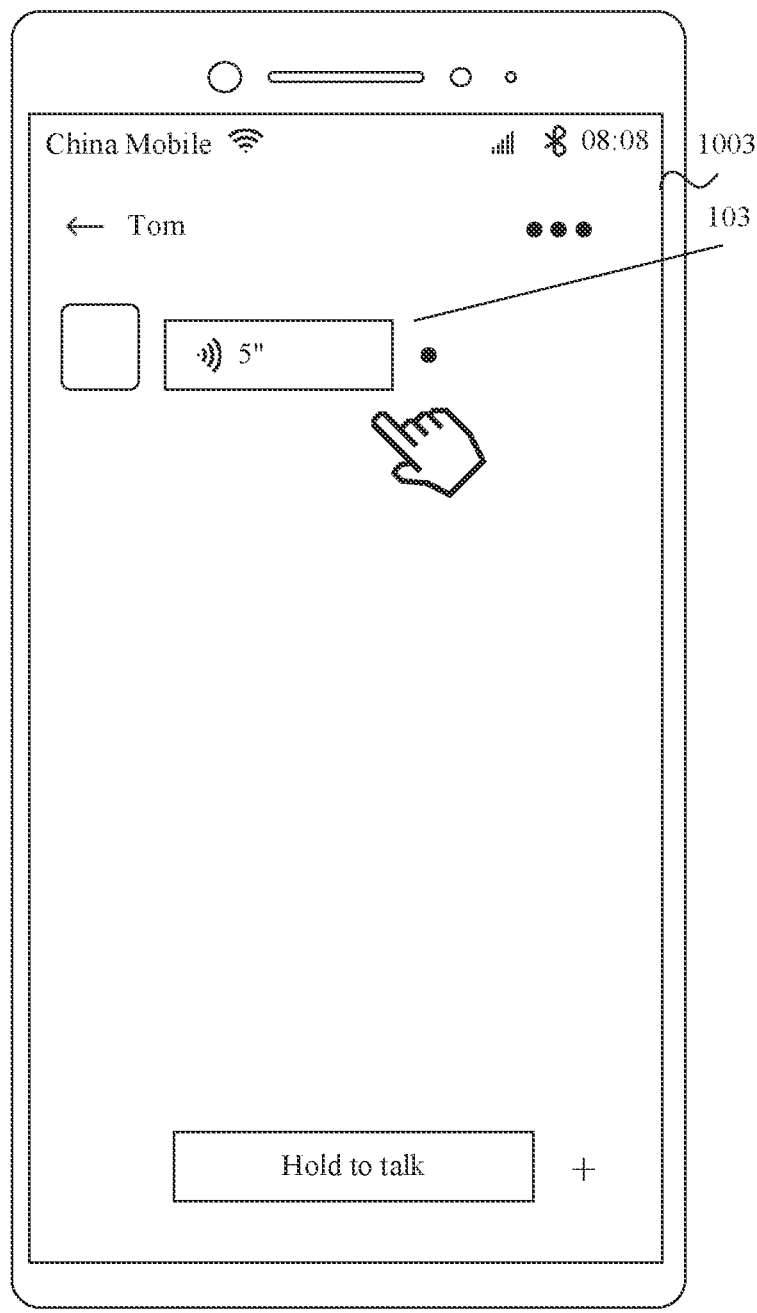
Figure 10D:
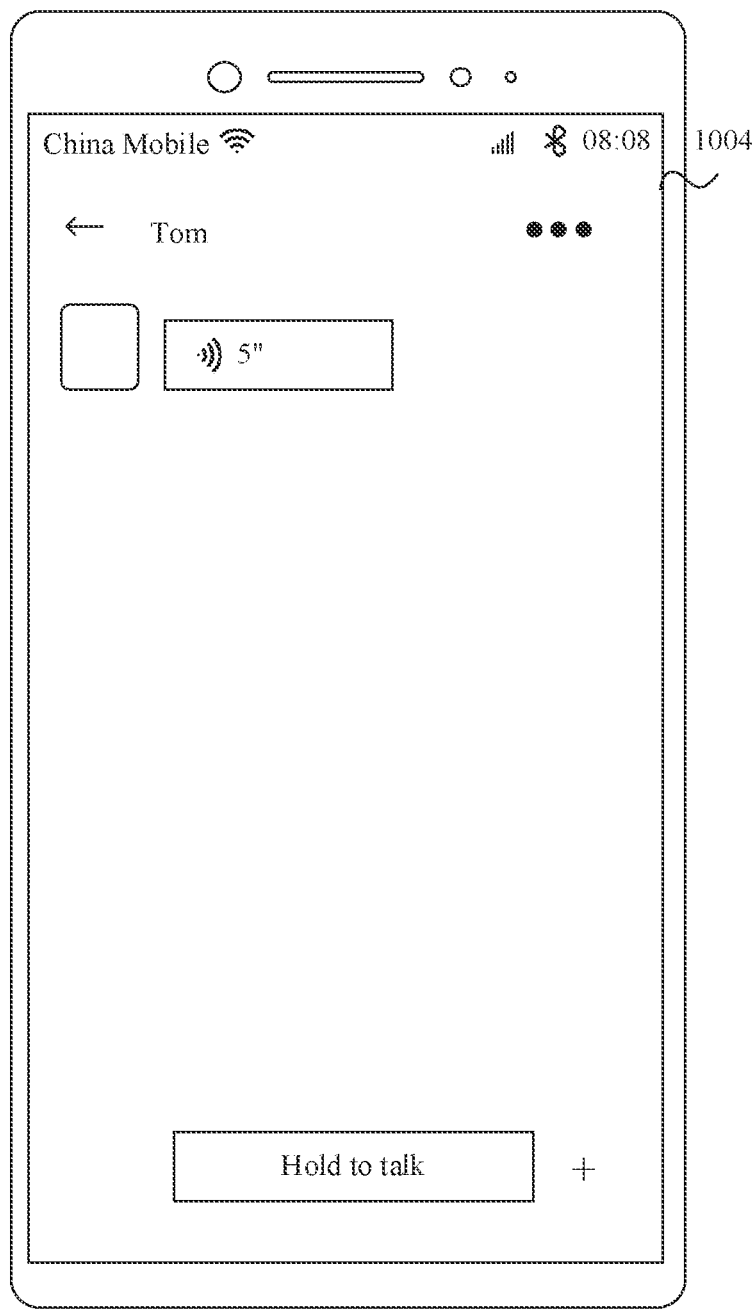

For example, on a home screen 1001 shown in FIG. 10(a), the third-party instant messaging application such as a social app in the mobile phone receives a message. In response to an operation of tapping a social app icon 101 by the user, the mobile phone opens the social app, and displays an interface 1002 shown in FIG. 10(b). In response to an operation of tapping an unread message icon 102 by the user, a chat interface 1003 shown in FIG. 10(c) is displayed. On the chat interface 1003, when the mobile phone detects an operation of tapping a short voice message icon 103 by the user, it indicates that the mobile phone receives a second call service of playing an unread short voice message, and the audio management module needs to select a module configured to play a sound. In this case, as shown in FIG. 9, based on the disconnected HFP connection, the audio management module determines that no device in a Bluetooth connection currently exists. In an interface 1004 shown in FIG. 10(d), the audio management module directly invokes a speaker of the mobile phone to play a current short voice message. In this process, the mobile phone can quickly process the second call service, and the user is unaware of processing.

Figure 11A:
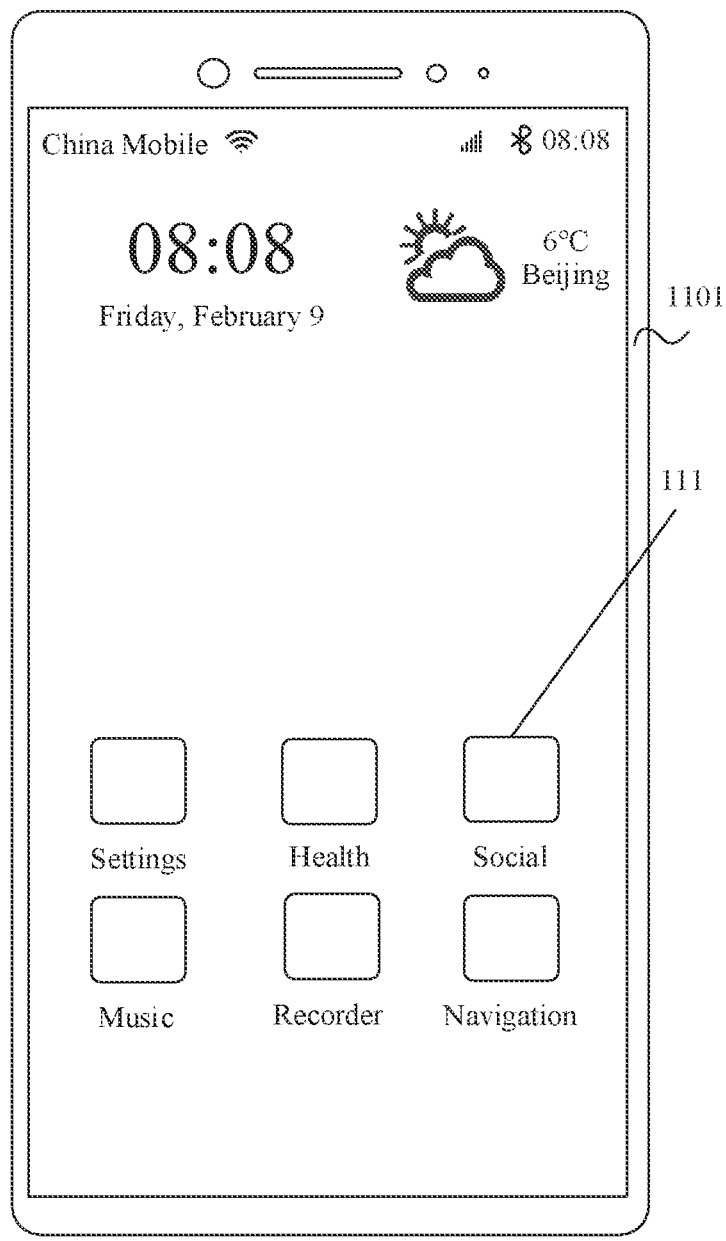
FIG. 11(a) to FIG. 11(e) are a schematic diagram 5 of an interface of an electronic device according to an embodiment of this application.
Figure 11B:
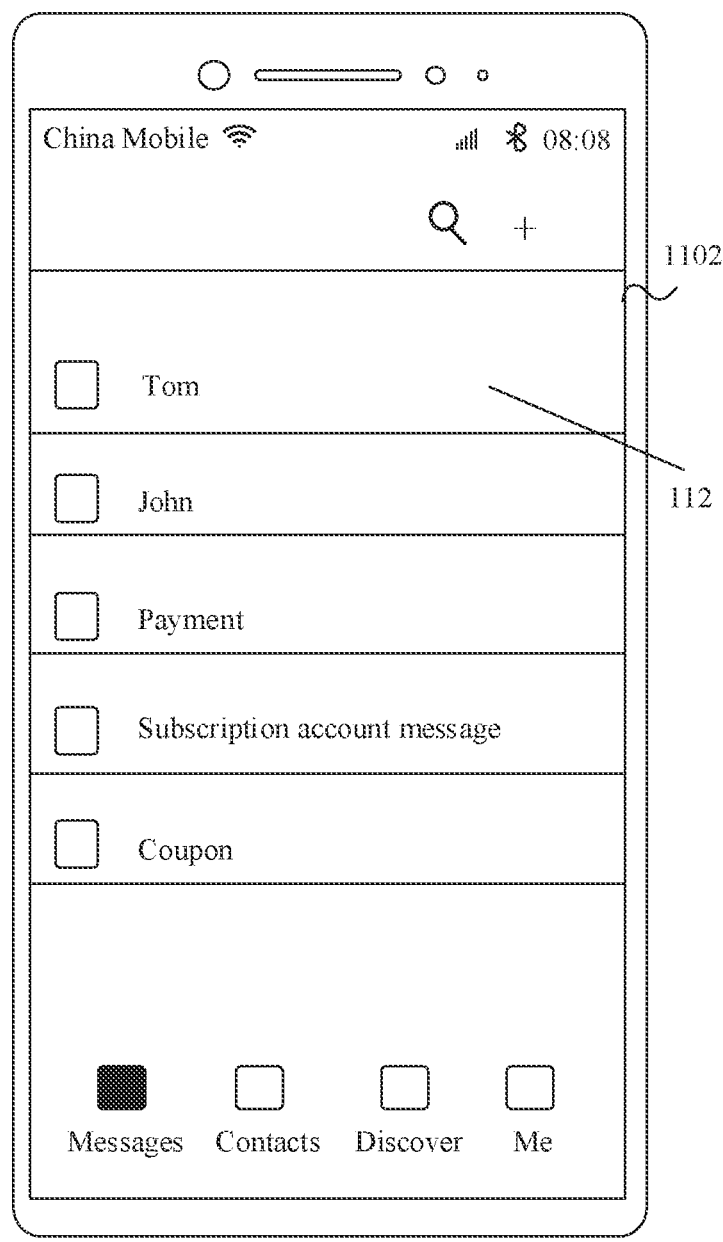
Figure 11C:
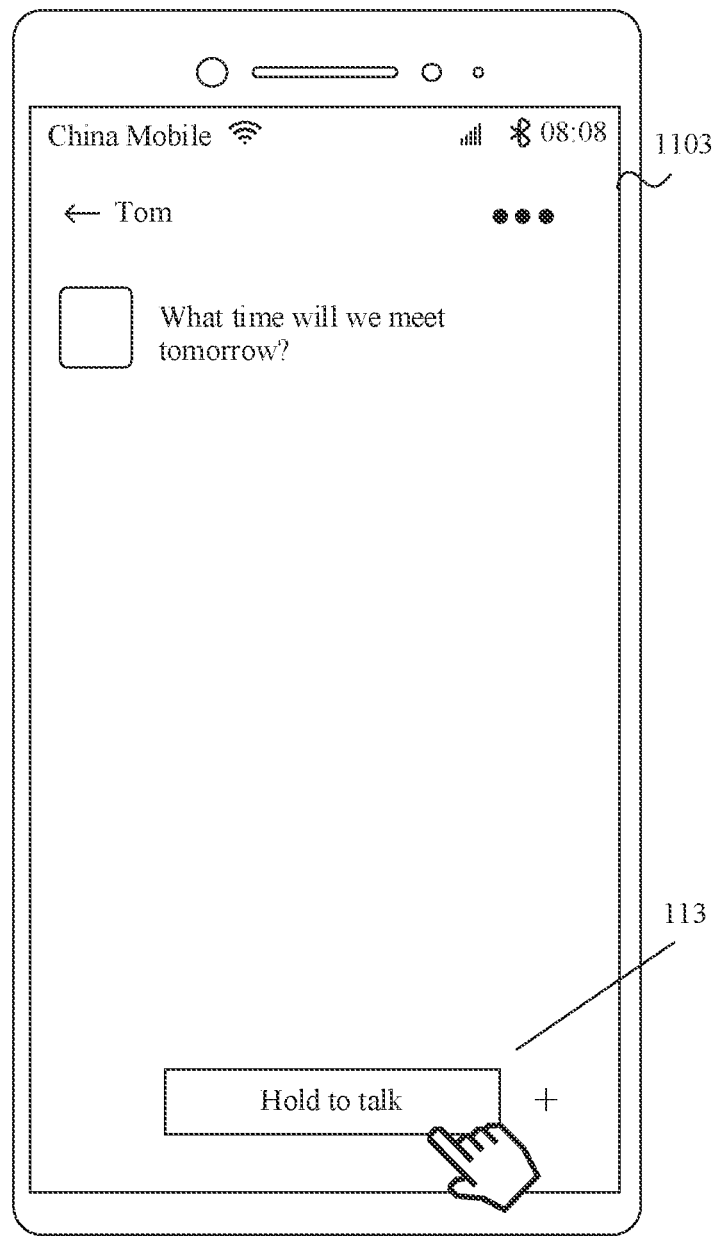
Figure 11D:
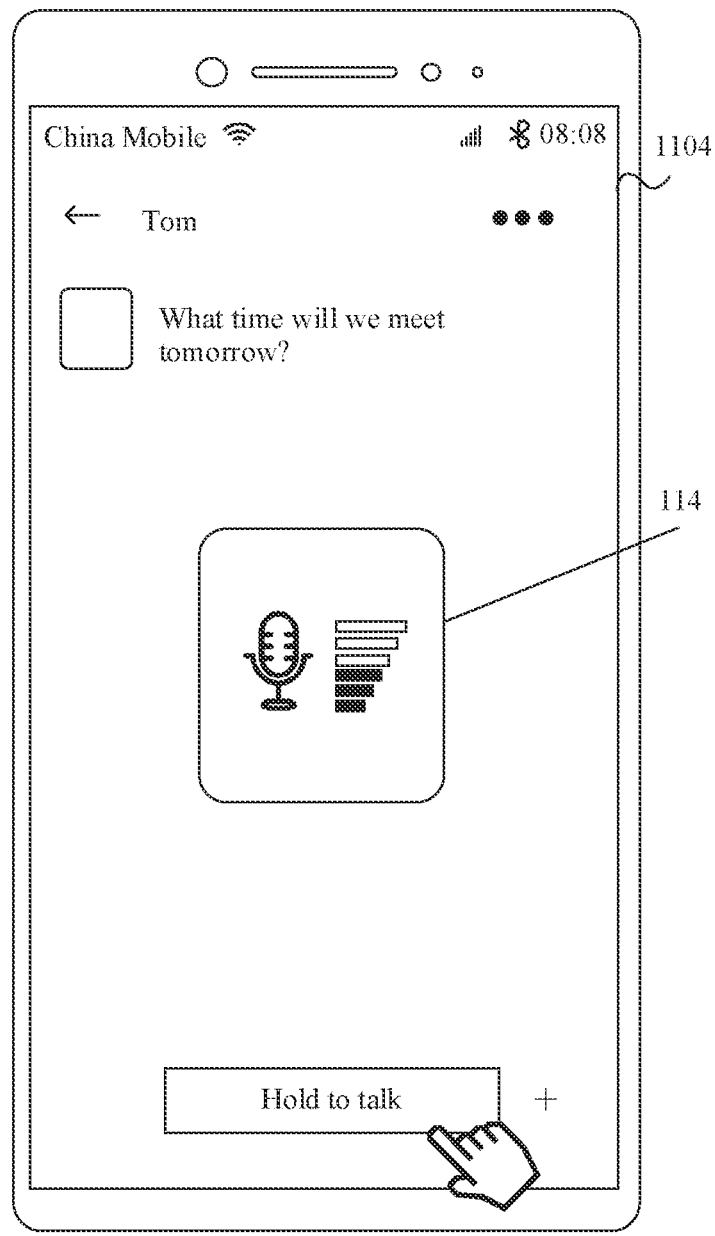

Alternatively, on a home screen 1101 shown in FIG. 11(a), after detecting an operation of tapping a social app icon 11 by the user, the mobile phone displays an interface 1102 shown in FIG. 11(b). In response to an operation of tapping an icon 112 by the user, an interface 1103 shown in FIG. 11(c) is displayed. On the interface 1103, if the mobile phone detects an operation of tapping an icon 113 by the user, it indicates that the user needs to send a short voice message. In other words, the mobile phone receives a second call service of recording the short voice message, and the audio management module needs to select a module configured to receive a voice. In this case, as shown in FIG. 9, based on the disconnected HFP connection, the audio management module determines that no device in a Bluetooth connection currently exists. In an interface 1104 shown in FIG. 11(d), the audio management module directly invokes a microphone of the mobile phone to record the short voice message. For example, an icon 114 that is displayed on the interface 1104 is used to prompt the user that the short voice message is being recorded. In this process, the mobile phone can process the second call service relatively quickly, and the user does not need to wait, to improve efficiency.

Figure 12:
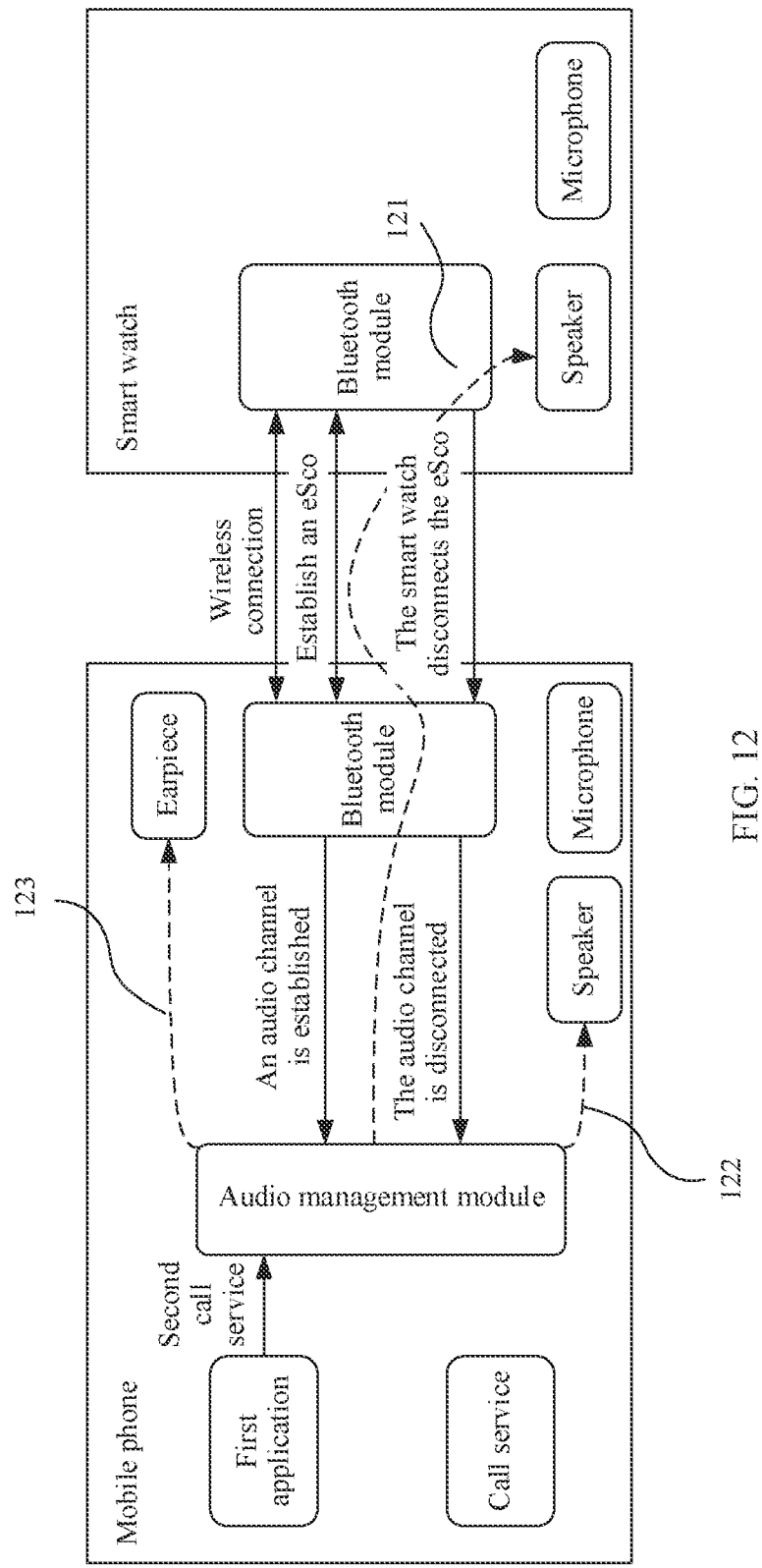
FIG. 12 is a schematic diagram 1 of an application scenario of a Bluetooth communication method in the conventional technology according to an embodiment of this application.

It should be noted that, if the HFP connection between the mobile phone and the smart watch is not disconnected in step S403, in a scenario, as shown in FIG. 12, if the HFP connection between the mobile phone and the smart watch is not disconnected, when the HFP connection exists, after the mobile phone receives the second call service, the Bluetooth module of the mobile phone sends an eSco establishment request to the Bluetooth module of the smart watch. In response to the eSco establishment request, the smart watch establishes an eSco with the mobile phone. After the eSco is established, the Bluetooth module of the mobile phone notifies the audio management module that an audio channel between the mobile phone and the smart watch has been established. Then, if the smart watch determines that the type of the call service currently processed by the mobile phone is the second call service, the smart watch disconnects the eSco between the smart watch and the mobile phone. Correspondingly, the Bluetooth module of the mobile phone notifies the audio management module that the audio channel between the mobile phone and the smart watch is disconnected. Then, the mobile phone can process the second call service by using the audio module such as the speaker or the microphone of the mobile phone.

Figure 10E:
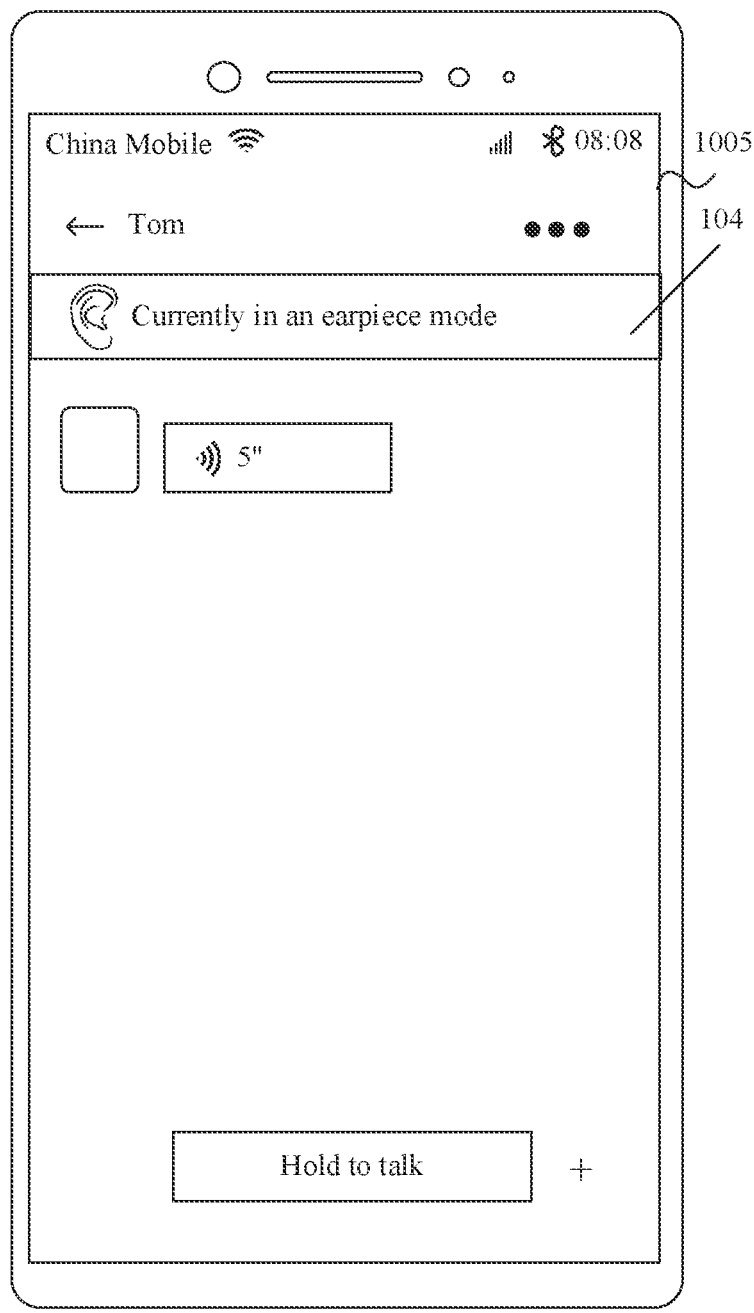
Figure 11E:
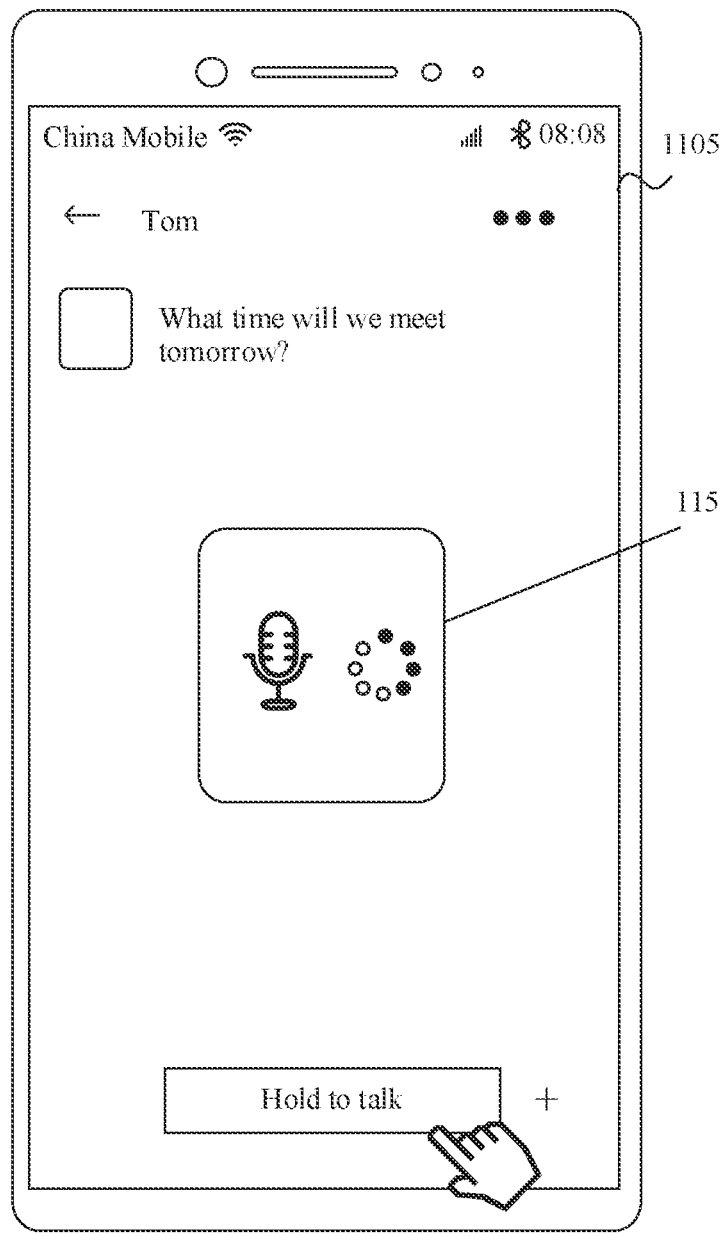

For example, in a short voice playing scenario shown in FIG. 10(c), in response to an operation of tapping the short voice message icon 103 by the user, after the smart watch establishes the eSco with the mobile phone, the audio management module sends audio data to the smart watch by using a link 121 shown in FIG. 12, that is, an established audio channel, and a speaker of the smart watch plays the audio data until the eSco is disconnected. In this process, if the user does not pay attention to the smart watch, the audio data is lost. In addition, in a process in which the mobile phone switches to the speaker of the mobile phone for playing the audio data, an exception may occur. As shown in FIG. 12, if switching is normal, the audio management module sends the audio data to the speaker of the mobile phone by using a link 122. If switching is abnormal, the audio management module sends the audio data to an earpiece of the mobile phone by using a link 123. An interface 1005 shown in FIG. 10(e) is an interface displayed by the mobile phone when abnormal switching occurs. The mobile phone displays a prompt box 104 on the interface 1005, to prompt the user that the mobile phone is currently playing a voice in an earpiece mode. In this case, the voice is low, and user experience is poor. In addition, in a short voice recording scenario shown in FIG. 11(c), a process from establishing the eSco between the mobile phone and the smart watch to disconnecting the eSco is time-consuming. In this case, on the interface 1103, the mobile phone displays, in response to an operation of tapping the icon 113 by the user, an interface 1105 shown in FIG. 11(e). An icon 115 is displayed on the interface 1105, and the user is prompted to wait for voice recording. Voice recording starts only after the eSco is disconnected from the mobile phone, resulting in poor user experience.

Figure 13:
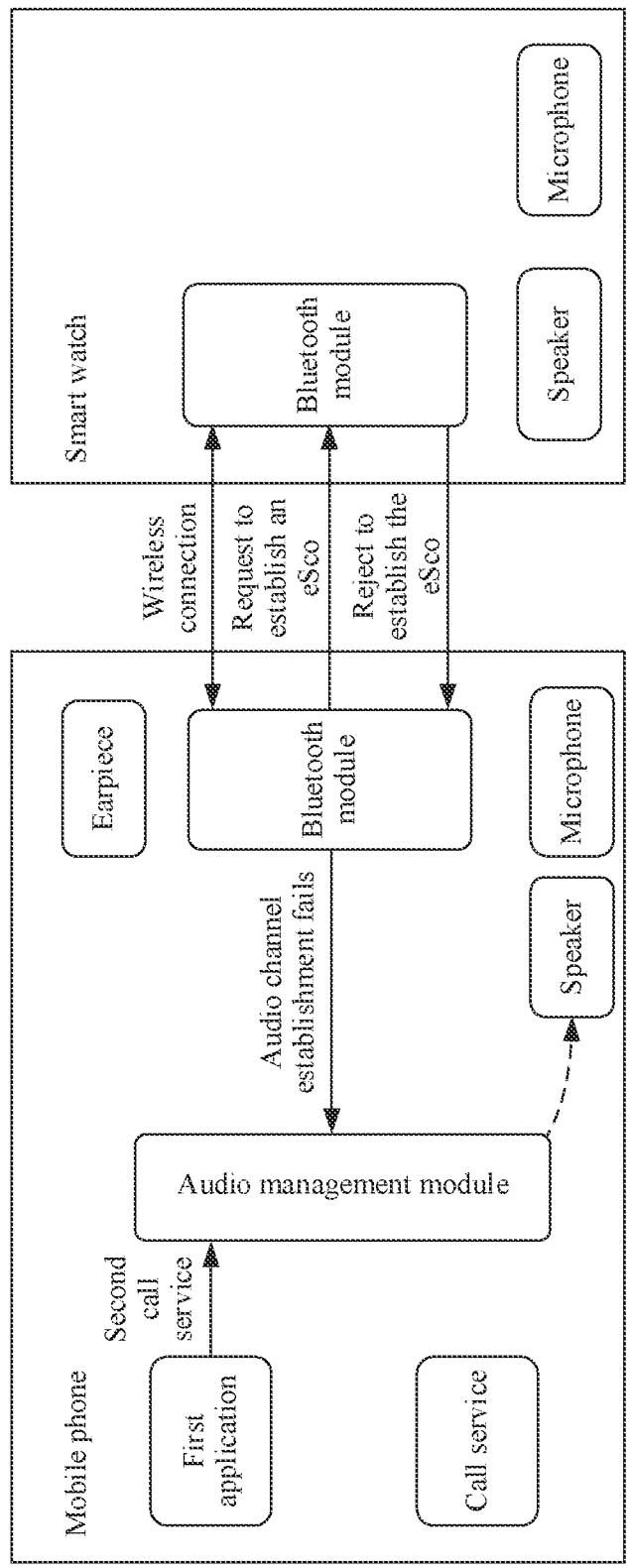
FIG. 13 is a schematic diagram 2 of an application scenario of a Bluetooth communication method in the conventional technology according to an embodiment of this application.

In another scenario, as shown in FIG. 13, if the HFP connection between the mobile phone and the smart watch is not disconnected, after the mobile phone receives the second call service, the Bluetooth module of the mobile phone sends the eSco establishment request to the Bluetooth module of the smart watch. After receiving the request, the smart watch temporarily does not establish an eSco with the mobile phone. Instead, the type of the call service currently processed by the mobile phone is determined first. If the call service is the second call service, a response for rejecting to establish the eSco is sent to the mobile phone. After determining that the smart watch rejects to establish the eSco, the mobile phone sends at least one eSco establishment request based on an eSco data packet (packet) type. After establishment requests corresponding to all eSco data packet types are rejected by the smart watch, the mobile phone determines that eSco establishment fails. The Bluetooth module of the mobile phone notifies the audio management module that establishment of the audio channel between the mobile phone and the smart watch fails. Then, the mobile phone can process the second call service by using the audio module such as the speaker or the microphone of the mobile phone.

For example, in the short voice playing scenario shown in FIG. 10(c) or the short voice recording scenario shown in FIG. 11(c), in a process in which the smart watch determines the call service type of the mobile phone and the mobile phone and the smart watch request to establish the eSco a plurality of times, the mobile phone needs to continuously wait until the mobile phone confirms that the eSco establishment fails. In other words, in the foregoing processes, the user needs to wait for playing or recording of a short voice. Consequently, user experience is affected.

It can be learned that, in comparison with the foregoing two example scenarios, in the foregoing step S403, the smart watch actively disconnects the HFP connection to the mobile phone, to ensure that the mobile phone does not detect the smart watch when receiving the second call service. In this case, the mobile phone may directly choose to use the audio module of the mobile phone to process the second call service, thereby reducing time consumption and avoiding an audio data loss. In addition, the user can process the second call service by operating one mobile phone, thereby reducing operation difficulty of the user.

S406: If the call service is the first call service, the mobile phone sends a first notification to the smart watch.

The first notification is used to indicate the smart watch to process the first call service. The first notification may include, for example, an incoming call notification message or an outgoing call notification message.

Optionally, as described in the foregoing step S404, after receiving the system broadcast message, the application A in the mobile phone determines that the current call service is the first call service, and sends the first notification to the smart watch. After receiving the first notification, the smart watch may learn that the mobile phone currently receives the first call service. Alternatively, the application A learns, in another preconfigured manner, for example, by monitoring the hardware status of the mobile phone, of the first call service received by the mobile phone, and sends the first notification to the smart watch.

Optionally, the first notification is notification information in a preconfigured format between the mobile phone and the smart watch. For example, if the first notification is a packet in a fixed format, after receiving the first notification, the smart watch may learn, by directly parsing the packet or based on a packet identifier, that the mobile phone receives the first call service.

Figure 14:
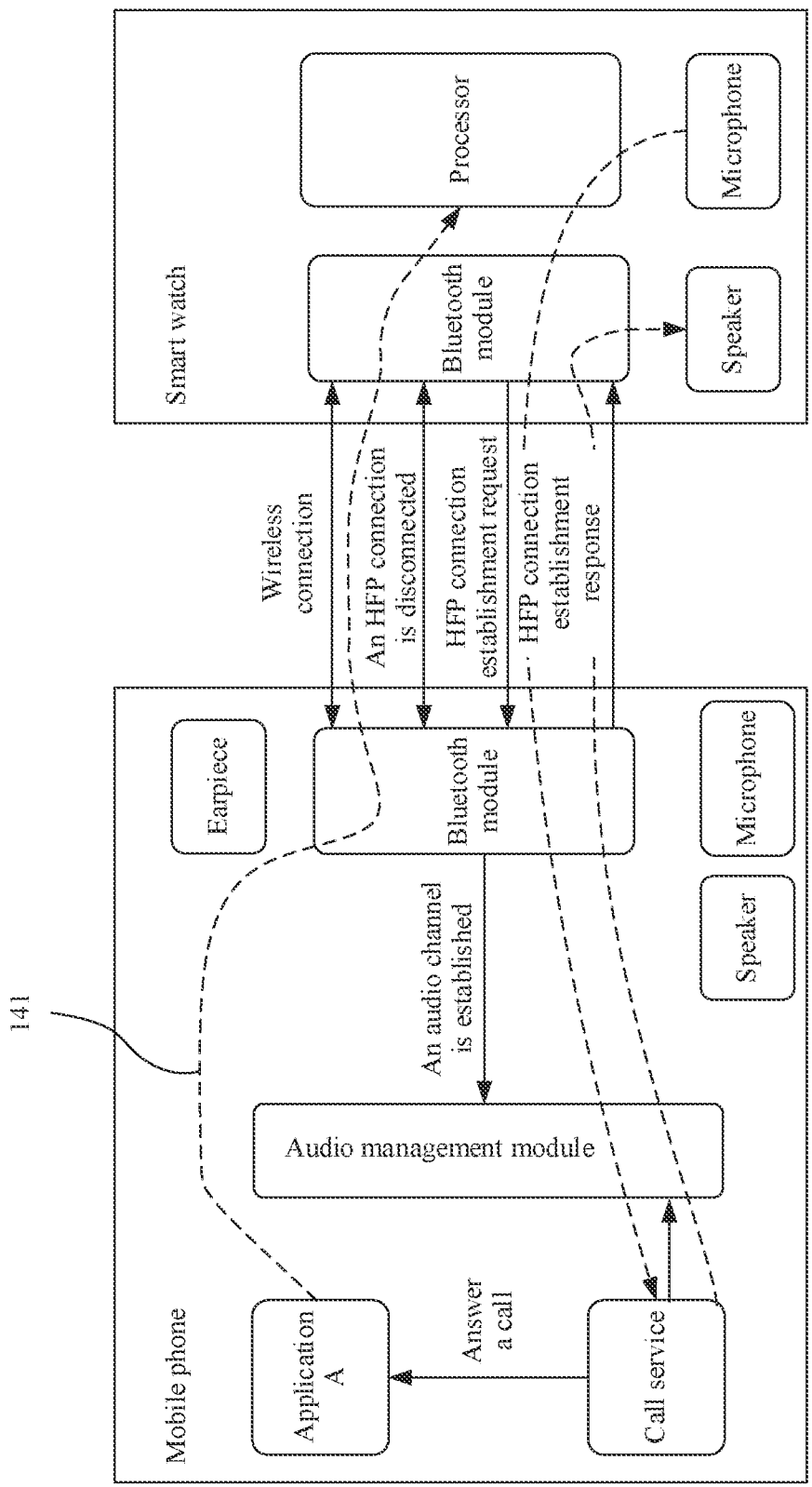
FIG. 14 is a schematic diagram 2 of an application scenario of a Bluetooth communication method according to an embodiment of this application.

For example, as shown in FIG. 14, the application A confirms that the mobile phone receives the first call service. For example, the first call service is a call service for answering a call. The application A sends the first notification to the smart watch in a Bluetooth transmission manner by using a link 141. The processor of the smart watch receives and parses the first notification, to learn that the mobile phone receives the first call service.

It should be noted that after receiving either of the first call service and the second call service, the mobile phone may send a notification message to the smart watch. For example, after receiving the second call service, the mobile phone sends a second notification to the smart watch. If the smart watch determines, based on the second notification, that the mobile phone currently receives the second call service, the smart watch does not process the current call service.

S407: The smart watch establishes the HFP connection to the mobile phone.

Optionally, after receiving the first notification, the smart watch determines, based on the first notification, that the mobile phone currently receives the first call service, and sends an HFP connection establishment request to the mobile phone. The mobile phone sends an HFP connection establishment response to the smart watch in response to the HFP connection establishment request, and establishes the HFP connection to the smart watch by using the step of establishing the HFP connection in step S402.

For example, as shown in FIG. 14, the smart watch invokes the Bluetooth module to send the HFP connection establishment request to the Bluetooth module of the mobile phone. After receiving the HFP connection establishment request, the mobile phone agrees to establish the HFP connection, and sends the HFP connection establishment response to the smart watch. Based on the reestablished HFP connection, the Bluetooth module of the mobile phone notifies the audio management module that a Bluetooth audio channel between the mobile phone and the smart watch is currently established.

S408: Based on the HFP connection, the mobile phone processes the first call service.

Optionally, the mobile phone determines that the HFP connection to the smart watch is currently established. Based on the HFP connection, the mobile phone sends an eSco establishment request to the smart watch. After the smart watch agrees, the mobile phone sends audio data to the smart watch and/or receives audio data sent by the smart watch, to complete processing of the first call service. In this way, after receiving the first call service, the mobile phone notifies the smart watch, so that the smart watch actively establishes the HFP connection to the mobile phone. In this way, the first call service is processed conveniently and quickly by using the smart watch.

For example, as shown in FIG. 14, after the HFP connection between the mobile phone and the smart watch is successfully established, the audio management module determines that modules that can be currently configured to process audio include audio modules such as the Bluetooth module, the speaker, and the microphone. The audio management module selects a Bluetooth audio module with a higher priority as an input/output module of the audio data. In other words, the mobile phone selects a device on the HFP connection to process the first call service, and uses the smart watch to answer or make a call. As shown in FIG. 14, the mobile phone plays audio data by using a speaker of the smart watch, and collects audio data by using a microphone of the smart watch. In other words, the mobile phone sends the audio data to the smart watch, and receives the audio data sent by the smart watch, to complete the call. A priority of an audio data input/output module is preconfigured in the mobile phone. Generally, a priority of the Bluetooth module of the mobile phone is higher than that of a module such as the speaker and the microphone of the mobile phone.

It should be noted that, in a process m which the smart watch reestablishes the HFP connection to the mobile phone, the audio management module of the mobile phone may have queried once whether an established audio channel exists. After the HFP connection is reestablished, the audio management module detects the audio channel again. An HFP reestablishment process takes an extremely short time, and it can be ensured that the HFP connection is reestablished without being perceived by the user. In this case, the mobile phone receives an operation that the user starts to perform the first call service, for example, tapping a button for answering a call. In this case, the audio channel is established, and the audio management module directly processes, based on the audio channel, the audio data by using Bluetooth, so that no audio data loss is caused.

S409: After the first call service ends, the smart watch disconnects the HFP connection.

Optionally, after completing processing of the first call service, the smart watch actively releases the HFP connection to the mobile phone. In this way, it is ensured that the mobile phone can process the first call service by using the smart watch. This also ensures that when the mobile phone receives the second call service next time, the mobile phone does not send an eSco establishment request to the smart watch based on the HFP connection, to avoid a call exception. In other words, after the smart watch actively releases the HFP connection, the foregoing step S404 to step S409 are cyclically performed.

It can be learned that, according to the Bluetooth communication method provided in this application, when the mobile phone has no first call service, the wearable device can actively release the HFP connection to the mobile phone. In this way, after the mobile phone subsequently receives the second call service, problems such as an audio data stream loss, a voice switching exception, and a waiting delay do not occur. In addition, after the mobile phone receives the first call service, the wearable device can learn that the mobile phone is processing the first call service. The wearable device actively establishes the HFP connection to the mobile phone, so that the mobile phone may process, based on the HFP connection, the first call service by using the wearable device. In this way, efficiency of processing the first call service and the second call service by the mobile phone is improved, so that a user operation is facilitated, and user experience is improved.

The foregoing method is not only applicable to a scenario of a telephone voice message, but also applicable to a scenario of a voice message for a third-party application. Generally, the first application is installed in the mobile phone. Correspondingly, a watch version of the first application is installed in the smart watch, or the first application may not be installed in the smart watch. An HFP service is established between the mobile phone and the smart watch. When the mobile phone does not need to process a call, the HFP service can be automatically disconnected. In this case, when detecting an operation of tapping to play a voice message in the first application by the user, the mobile phone may directly play the voice message. Because the HFP service is disconnected in this case, a delay caused after the mobile phone detects the HFP service is avoided.

In this embodiment of this application, an app corresponding to the smart watch is usually installed in the mobile phone, and the app is usually developed by a mobile phone manufacturer and a smart watch manufacturer. The user can set the smart watch in the app, for example, switch a watch face and add a new device. Signaling for the setting is usually a private Bluetooth protocol. In this embodiment of this application, the HFP service may be disconnected by using the app, to avoid a delay.

Figure 15:
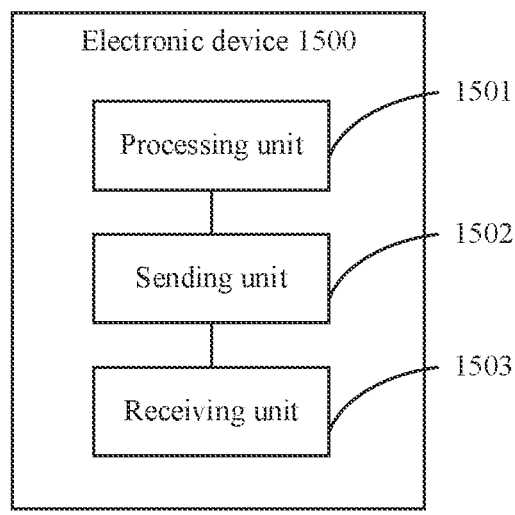
FIG. 15 is a schematic diagram 2 of a structure an electronic device according to an embodiment of this application.

As shown in FIG. 15, an embodiment of this application discloses an electronic device. The electronic device 1500 may be configured to implement the method described in the foregoing method embodiments. For example, the electronic device 1500 may specifically include a processing unit 1501, a sending unit 1502, and a receiving unit 1503. The processing unit 1501 is configured to support the electronic device 1500 in performing step S404 and step S405 in FIG. 4. The sending unit 1502 is configured to support the electronic device 1500 in performing step S406, step S407, and step S408 in FIG. 4. The receiving unit 1503 is configured to support the electronic device 1500 in performing step S407 and step S408 in FIG. 4. All related content of the steps in the foregoing method embodiments may be cited in function descriptions of the corresponding functional modules. Details are not described herein again.

Optionally, the electronic device 1500 shown in FIG. 15 may further include a storage unit (not shown in FIG. 15), and the storage unit stores a program or instructions. When the processing unit executes the program or the instructions, the electronic device 1500 shown in FIG. is enabled to perform the Bluetooth communication method shown in FIG. 4.

For technical effects of the electronic device 1500 shown in FIG. 15, refer to the technical effects of the Bluetooth communication method shown in FIG. 4. Details are not described herein again.

The processing unit in the electronic device 1500 shown in FIG. 15 may be implemented by a processor or a processor-related circuit component, and may be a processor or a processing module. The sending unit 1502 and the receiving unit 1503 may be combined into a transceiver unit. The transceiver unit may be implemented by a transceiver or a transceiver-related circuit component, and may be a transceiver or a transceiver module.

Figure 16:
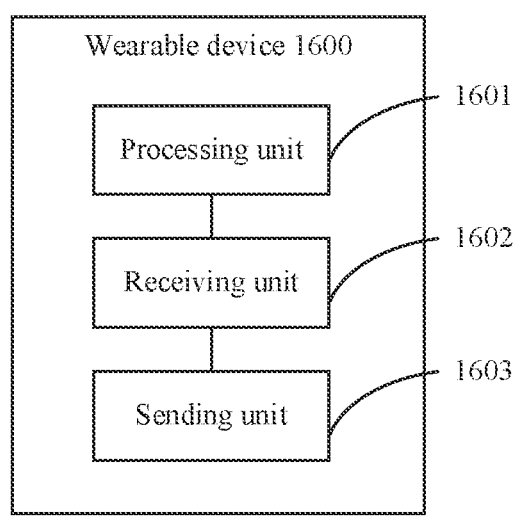
FIG. 16 is a schematic diagram 2 of a structure of a wearable device according to an embodiment of this application.

As shown in FIG. 16, an embodiment of this application discloses a wearable device. The wearable device 1600 may be configured to implement the method described in the foregoing method embodiments. For example, the wearable device 1600 may specifically include a processing unit 1601, a receiving unit 1602, and a sending unit 1603. The processing unit 1601 is configured to support the wearable device 1600 in performing step S403 and step S409 in FIG. 4. The receiving unit 1602 is configured to support the wearable device 1600 in performing step S406, step S407, and step S408 in FIG. 4. The sending unit 1603 is configured to support the wearable device 1600 in performing step S407 and step S408 in FIG. 4. All related content of the steps in the foregoing method embodiments may be cited in function descriptions of the corresponding functional modules. Details are not described herein again.

Optionally, the wearable device 1600 shown in FIG. 16 may further include a storage unit (not shown in FIG. 16), and the storage unit stores a program or instructions. When the processing unit executes the program or the instructions, the wearable device 1600 shown in FIG. 16 is enabled to perform the Bluetooth communication method shown in FIG. 4.

For technical effects of the wearable device 1600 shown in FIG. 16, refer to the technical effects of the Bluetooth communication method shown in FIG. 4. Details are not described herein again.

The processing unit in the wearable device 1600 shown in FIG. 16 may be implemented by a processor or a processor-related circuit component, and may be a processor or a processing module. The receiving unit 1602 and the sending unit 1603 may be combined into a transceiver unit. The transceiver unit may be implemented by a transceiver or a transceiver-related circuit component, and may be a transceiver or a transceiver module.

An embodiment of this application provides a Bluetooth communications system. The Bluetooth communications system includes the electronic device shown in FIG. 15 and the wearable device shown in FIG. 16. An HFP connection is established between the electronic device and the wearable device.

The electronic device is configured to automatically disconnect the HFP connection when the electronic device meets a preset condition.

The electronic device is further configured to send a first notification to the wearable device after receiving an incoming call.

The wearable device is configured to establish the HFP connection to the electronic device based on the first notification.

The electronic device is further configured to: after detecting an operation of answering the incoming call by a user, send first audio data of the incoming call to the wearable device and/or receive second audio data of the incoming call sent by the wearable device.

In a possible implementation, the electronic device is further configured to send a second notification to the wearable device after detecting an operation of making an outgoing call by the user.

The wearable device is further configured to establish the HFP connection to the electronic device based on the second notification.

After a call connection is established, the electronic device is further configured to send third audio data of the outgoing call to the wearable device and/or receive fourth audio data of the outgoing call sent by the wearable device.

In a possible implementation, the wearable device is further configured to disconnect the HFP connection to the electronic device after detecting a call termination operation or receiving a call termination indication sent by the electronic device.

In a possible implementation, the electronic device is further configured to: when detecting an operation of playing first audio of a first application or recording second audio by using the first application, play the first audio or record the second audio.

In a possible implementation, the operation of playing the first audio includes any one of the following: an operation of playing a first voice message, an operation of answering a video call, and an operation of answering an audio call.

In a possible implementation, the operation of recording the second audio by using the first application includes an operation of recording a second voice message by using the first application or an operation of performing voice recording by using the first application.

In a possible implementation, the electronic device is further configured to collect third audio after a video call connection or an audio call connection is established.

In a possible implementation, the preset condition includes that the electronic device does not receive an incoming call or does not detect an operation of making an outgoing call.

For technical effects of the Bluetooth communications system, refer to the technical effects of the foregoing Bluetooth communication method. Details are not described herein again.

An embodiment of this application further provides a chip system. The chip system includes at least one processor and at least one interface circuit. The processor and the interface circuit may be interconnected through a line. For example, the interface circuit may be configured to receive a signal from another apparatus. For another example, the interface circuit may be configured to send a signal to another apparatus. For example, the interface circuit may read instructions stored in a memory, and send the instructions to the processor. When the instructions are executed by the processor, an electronic device is enabled to perform steps performed by the mobile phone in the foregoing embodiments, or a wearable device is enabled to perform the steps performed by the mobile phone in the foregoing embodiments. Certainly, the chip system may further include another discrete device. This is not specifically limited in this embodiment of this application.

An embodiment of this application further provides a computer-readable storage medium. The computer-readable storage medium stores computer instructions. When the computer instructions are run on an electronic device, the electronic device is enabled to perform the related method steps, to implement the Bluetooth communication method in the foregoing embodiment.

An embodiment of this application further provides a computer-readable storage medium. The computer-readable storage medium stores computer instructions. When the computer instructions are run on a wearable device, the wearable device is enabled to perform the related method steps, to implement the Bluetooth communication method in the foregoing embodiment.

An embodiment of this application further provides a computer program product. When the computer program product runs on a computer, the computer is enabled to perform the foregoing related steps, to implement the Bluetooth communication method in the foregoing embodiment.

In addition, an embodiment of this application further provides an apparatus. The apparatus may be specifically a component or a module, and the apparatus may include a processor and a memory that are connected to each other. The memory is configured to store computer-executable instructions. When the apparatus runs, the processor may execute the computer-executable instructions stored in the memory, so that the apparatus performs the Bluetooth communication method in the foregoing method embodiments.

The electronic device, the wearable device, the computer-readable storage medium, the computer program product, or the chip provided in embodiments of this application is configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division into the foregoing functional modules is taken as an example for illustration. In actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed methods may be implemented in other manners. For example, the described terminal device embodiment is merely an example. For example, division into the modules or the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the modules or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, the functional units in embodiments of this application may be integrated into one processing unit, or each of the units may exist alone physically, or two or more of the units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program instructions, for example, a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A system comprising:
   a wearable device; and
   an electronic device coupled to the wearable device and configured to:
   automatically disconnect a Hands-Free Protocol (HFP) connection between the electronic device and the wearable device when the electronic device meets a preset condition;
   receive an incoming call;
   send, in response to receiving the incoming call, a first notification to the wearable device, wherein the wearable device is configured to re-establish the HFP connection to the electronic device based on the first notification, and wherein the electronic device is further configured to:
   detect a first operation of answering the incoming call by a user;
   send, in response to detecting the first operation, first audio data of the incoming call to the wearable device or receive, in response to detecting the first operation, second audio data of the incoming call from the wearable device;
   detect a second operation of making an outgoing call by the user; and
   send, in response to detecting the second operation, a second notification to the wearable device,
   wherein the wearable device is further configured to re-establish the HFP connection to the electronic device based on the second notification, and
   wherein after a call connection is established, the electronic device is further configured to:
   send third audio data of the outgoing call to the wearable device; or
   receive fourth audio data of the outgoing call from the wearable device.

2. The system of claim 1, wherein the preset condition comprises that the electronic device does not detect a third operation of making an outgoing call.

3. The system of claim 1, wherein the wearable device is further configured to:
   detect a call termination operation or receive a call termination indication from the electronic device; and
   re-disconnect, in response to detecting the call termination operation or receiving the call termination indication, the HFP connection to the electronic device.

4. The system of claim 1, wherein the electronic device is further configured to:
   detect a third operation of playing a first audio of a first application or a fourth operation of recording a second audio using the first application; and
   play, in response to detecting the third operation, the first audio or record, in response to detecting the fourth operation, the second audio.

5. The system of claim 4, wherein the third operation comprises any one of playing a voice message, answering a video call, or answering an audio call.

6. The system of claim 4, wherein the fourth operation comprises recording a voice message using the first application or performing voice recording using the first application.

7. The system of claim 4, wherein the electronic device is further configured to collect a fourth audio after a video call connection is established or an audio call connection is established.

8. The system of claim 1, wherein the preset condition comprises that the electronic device does not receive the incoming call.

9. An electronic device comprising:
   a memory configured to store instructions; and
   a processor coupled to the memory and configured to execute the instructions to cause the electronic device to:
   automatically disconnect a Hands-Free Protocol (HFP) connection to a wearable device when a preset condition is met;
   receive an incoming call;
   send, in response to receiving the incoming call, a first notification to the wearable device to enable the wearable device to re-establish the HFP connection based on the first notification;
   detect a first operation of answering the incoming call by a user;
   send, in response to detecting the first operation, first audio data of the incoming call to the wearable device or receive, in response to detecting the first operation, second audio data of the incoming call from the wearable device;
   detect a second operation of making an outgoing call by the user;

send, in response to detecting the second operation, a second notification to the wearable device to enable the wearable device to re-establish the HFP connection based on the second notification; and after a call connection is established:

send third audio data of the outgoing call to the wearable device; or receive fourth audio data of the outgoing call from the wearable device.

10. The electronic device of claim 9, wherein the preset condition comprises that the electronic device does not detect a third operation of making an outgoing call.

11. The electronic device of claim 9, wherein the processor is further configured to execute the instructions to cause the electronic device to re-disconnect the HFP connection to the wearable device after a call is terminated.

12. The electronic device of claim 9, wherein the processor is further configured to execute the instructions to cause the electronic device to perform the following operation:

detect a third operation of playing a first audio of a first application or a fourth operation of recording a second audio using the first application; and play, in response to detecting the third operation, the first audio or record, in response to detecting the fourth operation, the second audio.

13. The electronic device of claim 12, wherein the third operation comprises any one of playing a voice message, answering a video call, or answering an audio call.

14. The electronic device of claim 12, wherein the fourth operation comprises recording a voice message using the first application or performing voice recording using the first application.

15. The electronic device of claim 12, wherein the processor is further configured to execute the instructions to cause the electronic device to collect a fourth audio after a video call connection is established or an audio call connection is established.

16. The electronic device of claim 9, wherein the preset condition comprises that the electronic device does not receive the incoming call.

17. A wearable device comprising:

a memory configured to store instructions; and a processor coupled to the memory and configured to execute the instructions to cause the wearable device to:

determine that an electronic device meets a preset condition;

automatically disconnect, in response to determining that the electronic device meets the preset condition, a Hands-Free Protocol (HFP) connection to the electronic device;

receive a first notification that is sent after the electronic device receives an incoming call;

re-establish the HFP connection to the electronic device based on the first notification;

receive, from the electronic device, first audio data of the incoming call or send, to the electronic device, second audio data of the incoming call;

receive a second notification after the electronic device detects an operation of making an outgoing call by a user;

re-establish the HFP connection to the electronic device based on the second notification; and after a call connection is established:

receive, from the electronic device, third audio data of the outgoing call; or send, to the electronic device, fourth audio data of the outgoing call.

18. The wearable device of claim 17, wherein the preset condition comprises that the electronic device does not detect an operation of making an outgoing call.

19. The wearable device of claim 17, wherein the processor is further configured to execute the instructions to cause the wearable device to:

detect a call termination operation or receive a call termination indication from the electronic device; and re-disconnect, in response to detecting the call termination operation or receiving the call termination indication, the HFP connection to the electronic device.

20. The wearable device of claim 17, wherein the preset condition comprises that the electronic device does not receive the incoming call.

* * * * *